US012291920B1

(12) United States Patent
Earnest

(10) Patent No.: US 12,291,920 B1
(45) Date of Patent: May 6, 2025

(54) HEMMED EDGE OVERHEAD GARAGE DOOR SECTION AND METHOD OF MANUFACTURE AND USE

(71) Applicant: GRIDZ LLC, Knoxville, TN (US)

(72) Inventor: William Keith Earnest, Louisville, TN (US)

(73) Assignee: GRIDZ LLC, Knoxville, TN (US)

(*) Notice: Subject to any disclaimer, the term of this patent is extended or adjusted under 35 U.S.C. 154(b) by 0 days.

(21) Appl. No.: 18/535,994

(22) Filed: Dec. 11, 2023

(51) Int. Cl.
*E06B 3/48* (2006.01)
*E06B 3/70* (2006.01)

(52) U.S. Cl.
CPC ............ *E06B 3/485* (2013.01); *E06B 3/7009* (2013.01); *E06B 2003/7044* (2013.01)

(58) Field of Classification Search
CPC .... E06B 3/485; E06B 3/163; E06B 2003/166; E06B 3/16; E06B 3/723; E06B 2003/7023; E04C 2/292; Y10T 428/24198; E05D 15/242; E05Y 2900/106
See application file for complete search history.

(56) References Cited

U.S. PATENT DOCUMENTS 20,236 A 5/1858 Northen
2,782,887 A * 2/1957 Zimmermann ........... E06B 3/16 52/204.5
4,172,167 A * 10/1979 Greene ..................... E04C 2/38 428/595
4,685,266 A * 8/1987 Mullet .................... E04C 2/292 52/309.11
4,779,325 A 10/1988 Mullet
5,284,199 A 2/1994 Finch et al.
5,435,108 A * 7/1995 Overholt ................. E06B 3/485 52/309.11
5,802,801 A * 9/1998 Hohns ................... E05B 65/025 428/595
5,857,510 A * 1/1999 Krupke ................. E05D 15/242 160/187
6,381,917 B1 * 5/2002 Thielow .................... E06B 5/16 52/784.11
6,772,818 B2 * 8/2004 Whitley .................. E06B 3/485 52/309.9
6,883,578 B2 * 4/2005 Whitley ................ E06B 7/2301 160/133
6,899,157 B2 5/2005 Mullet

FOREIGN PATENT DOCUMENTS

DE 1509336 A1 7/1969
GB 743086 A 1/1956

* cited by examiner

*Primary Examiner* — Abe Massad
(74) *Attorney, Agent, or Firm* — Master Key IP, LLP; Jeromye V. Sartain

(57) ABSTRACT

A hemmed edge overhead garage door section having a face, a top rail integral with the face formed longitudinally therealong, the top rail having at least a top rail body extending rearwardly from the face and a top rail leg extending downwardly from the top rail body offset from the face, the top rail body and at least a portion of the top rail leg being thicker than the face, and a bottom rail integral with the face formed longitudinally therealong opposite of the top rail, the bottom rail comprising at least a bottom rail body extending rearwardly from the face and a bottom rail leg extending upwardly from the bottom rail body offset from the face, the bottom rail body and at least a portion of the bottom rail leg being thicker than the face.

20 Claims, 9 Drawing Sheets

HEMMED EDGE OVERHEAD GARAGE DOOR SECTION AND METHOD OF MANUFACTURE AND USE

BACKGROUND

The subject of this patent application relates generally to overhead garage door sections, and more particularly to overhead garage door sections having hemmed longitudinal edges for increased strength with reduced weight.

The following description includes information that may be useful in understanding the present invention. It is not an admission that any of the information provided herein is prior art or relevant to the presently claimed invention, or that any publication specifically or implicitly referenced is prior art.

Applicant(s) hereby incorporate herein by reference any and all patents and published patent applications cited or referred to in this application, to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

By way of background, overhead garage doors are widely known and used as having parallel horizontal sections that are interconnected by hinges and each have opposite rollers that operate in corresponding tracks mounted at the left and right sides of the garage structure adjacent the opening, each such track having a vertical portion that is substantially parallel to the front of the garage or building and a horizontal portion that is parallel to the floor and/or roof or ceiling of the garage or building with a curved portion of track therebetween, whereby the garage door can be operated whether manually or via a garage door motor assembly so as to shift between a substantially vertical closed position and a substantially horizontal open position. The typical sizes of such garage openings and thus such overhead garage doors are either eight feet (8 ft.) (single-car) or sixteen feet (16 ft.) (two-car) in width and approximately seven feet (7 ft.) in height made up of either three horizontal hinged door sections of approximately twenty-eight inches (28 in.) in height each or four horizontal hinged door sections of approximately twenty-one inches (21 in.) in height each, the latter currently being the most common. The related opening in which the garage door is installed is sized accordingly, the door frame generally comprising opposite vertical jambs and a horizontal header along with any related framing substructure or casing.

The individual sections of such an overhead garage door while originally constructed of wood are now predominantly formed of steel or aluminum. Early versions of such metal door sections involved sheet metal faces affixed on lengthwise rails. In current practice, sheet metal such as sheet steel is rolled and cut to width and length to form each individual door section, including forming the top and bottom longitudinal rails integrally with the face to provide strength and stiffness to the door section and stamping or embossing shapes in the face for aesthetic purposes. What is commonly referred to as a "pan door" is an overhead garage door made up of individual steel door sections having a single layer of sheet steel defining the face with integral rails; if the door section comprises only the sheet metal face and rails, then it is effectively "non-insulated." Such pan doors may instead be "insulated" as by being further formed having an interior layer of foam such as polystyrene or polyurethane that is glued or formed in place on or otherwise affixed to the back side of the section face between the rails for added strength as well as thermal insulation. And in a "sandwich" type pan door, each such "insulated" door section is further formed having an inner second layer of sheet steel or other metal opposite of the outer face and thus enclosing or "sandwiching" the insulation layer, such three-layer door having even further strength but also added cost and weight due to effectively doubling the amount of steel in each door section.

The overall front-to-back thickness of the typical pan overhead garage door is nominally two inches (2 in.) with the face and rails of each section formed from 26-gauge sheet steel having a thickness of approximately 0.018 inches (0.018 in.), which thickness is typically necessary for a double-car door to successfully pass each manufacturer's individually defined life cycle testing, such as for example 10,000 to 50,000 operational cycles. The problem is that this results in a relatively heavier and more expensive door than otherwise needed to meet requirements, particularly for single-car garage doors.

Other approaches to pan overhead door construction particularly to add further lengthwise stiffness and resistance to bending involve lengthwise struts on the door that extend rearwardly or inwardly from the back of each or at least one or more door section. While early metal garage doors involved such struts being separately roll-formed and then fastened or otherwise installed on the back or inner side of each door section adjacent the top and/or bottom edges, a practice still widely employed to this day, more recent designs provide for such struts to be integrally formed with the garage door face and rails. For example, U.S. Pat. No. 4,779,325 to Mullet discloses a method of making an overhead garage door panel (9) having a front sheet metal skin (10) and a rear skin (11) of insulating material and a core (12) of synthetic foam between the skins, the marginal edges of the metal skin (10) being progressively formed into folded-over hems (24) of double thickness, the hems (24) then being further progressively roll-formed into rearwardly disposed upwardly offset upper and lower channels (20) and (20') extending longitudinally of the panel (9) and then applying vertical metal end stiles (13) to the ends of the channels (20) and (20') to enclose the ends of the core (12), such that in Mullet the hems (24) are effectively integral lengthwise struts disposed laterally or rearwardly beyond the rails (19) and (19') of the door section, which rails (19) and (19') remain single-ply. Currently a prominent example of such an insulated pan overhead door with integral struts is the Model 9100 garage door manufactured and sold by Wayne Dalton. While the Wayne Dalton Model 9100 door has certain advantages in construction by being formed from relatively thinner sheet steel, such as 32-gauge or nominally 0.0095 inch (0.0095 in.) thick steel, enabled by the integral struts and the foamed-in-place polyurethane insulation, since steel cost is determined by the thickness of the steel and the line time to produce it, the effective cost may be relatively higher than what would otherwise be expected even if thinner and thus less total amount or weight of steel in each door or door section. And though the struts being integral may save installation time on the job site and again add strength just as bolt-on struts, and the Model 9100 door also boasts a nominal overall thickness of only one inch (1 in.), not including the integral struts, compared to the typical two-inch (2 in.) door thickness, saving cost and weight, the integral struts still present downsides particularly in storage and shipment of the doors.

What has been needed and heretofore unavailable is a new and improved overhead garage door section configuration and method of its manufacture and use offering reduced weight, size, and/or cost over currently available configurations. Aspects of the present invention fulfill these needs and provide further related advantages as described in the following summary.

SUMMARY

Aspects of the present invention teach certain benefits in construction and use which give rise to the exemplary advantages described below.

The present invention solves the problems described above by providing a new and novel hemmed edge overhead garage door section and method of manufacture and use. In at least one embodiment, the hemmed edge overhead garage door section comprises a face, a top rail integral with the face formed longitudinally therealong, the top rail comprising at least a top rail body extending rearwardly from the face and a top rail leg extending downwardly from the top rail body offset from the face, the top rail body and at least a portion of the top rail leg being thicker than the face, and a bottom rail integral with the face formed longitudinally therealong opposite of the top rail, the bottom rail comprising at least a bottom rail body extending rearwardly from the face and a bottom rail leg extending upwardly from the bottom rail body offset from the face, the bottom rail body and at least a portion of the bottom rail leg being thicker than the face, wherein the face and the top and bottom rails thereof are formed integrally of a single material and define a full depth of the hemmed edge overhead garage door section without any rearwardly extending strut, and wherein the resulting hemmed edge overhead garage door section has a relatively thinner face and relatively thicker top and bottom rails for increased strength with reduced weight and cost.

Other objects, features, and advantages of aspects of the present invention will become more apparent from the following detailed description, taken in conjunction with the accompanying drawings, which illustrate, by way of example, the principles of aspects of the invention.

BRIEF DESCRIPTION OF THE DRAWINGS

The accompanying drawings illustrate aspects of the present invention. In such drawings.

Figure 1A:
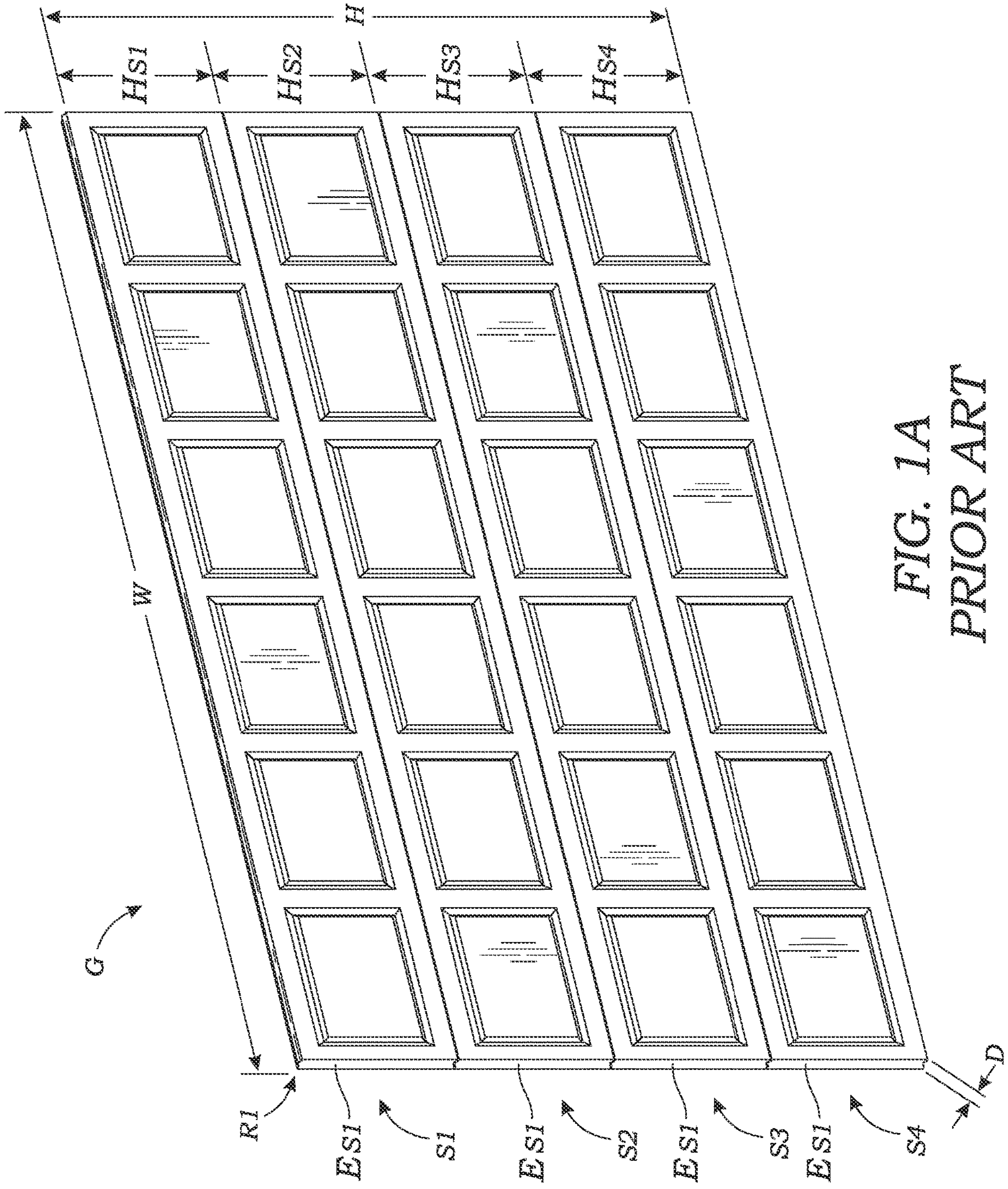
FIG. 1A PRIOR ART
FIG. 1A is a front perspective view of an exemplary prior art overhead garage door having four sections.

The above described drawing figures illustrate aspects of the invention in at least one of its exemplary embodiments, which are further defined in detail in the following description. Features, elements, and aspects of the invention that are referenced by the same numerals in different figures represent the same, equivalent, or similar features, elements, or aspects, in accordance with one or more embodiments. More generally, those skilled in the art will appreciate that the drawings are schematic in nature and are not to be taken literally or to scale in terms of material configurations, sizes, thicknesses, and other attributes of an apparatus according to aspects of the present invention unless specifically set forth herein.

DETAILED DESCRIPTION

The following discussion provides many exemplary embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

While the inventive subject matter is susceptible of various modifications and alternative embodiments, certain illustrated embodiments thereof are shown in the drawings and will be described below in detail. It should be understood, however, that there is no intention to limit the invention to any specific form disclosed, but on the contrary, the inventive subject matter is to cover all modifications, alternative embodiments, and equivalents falling within the scope of the claims.

Figure 1B:
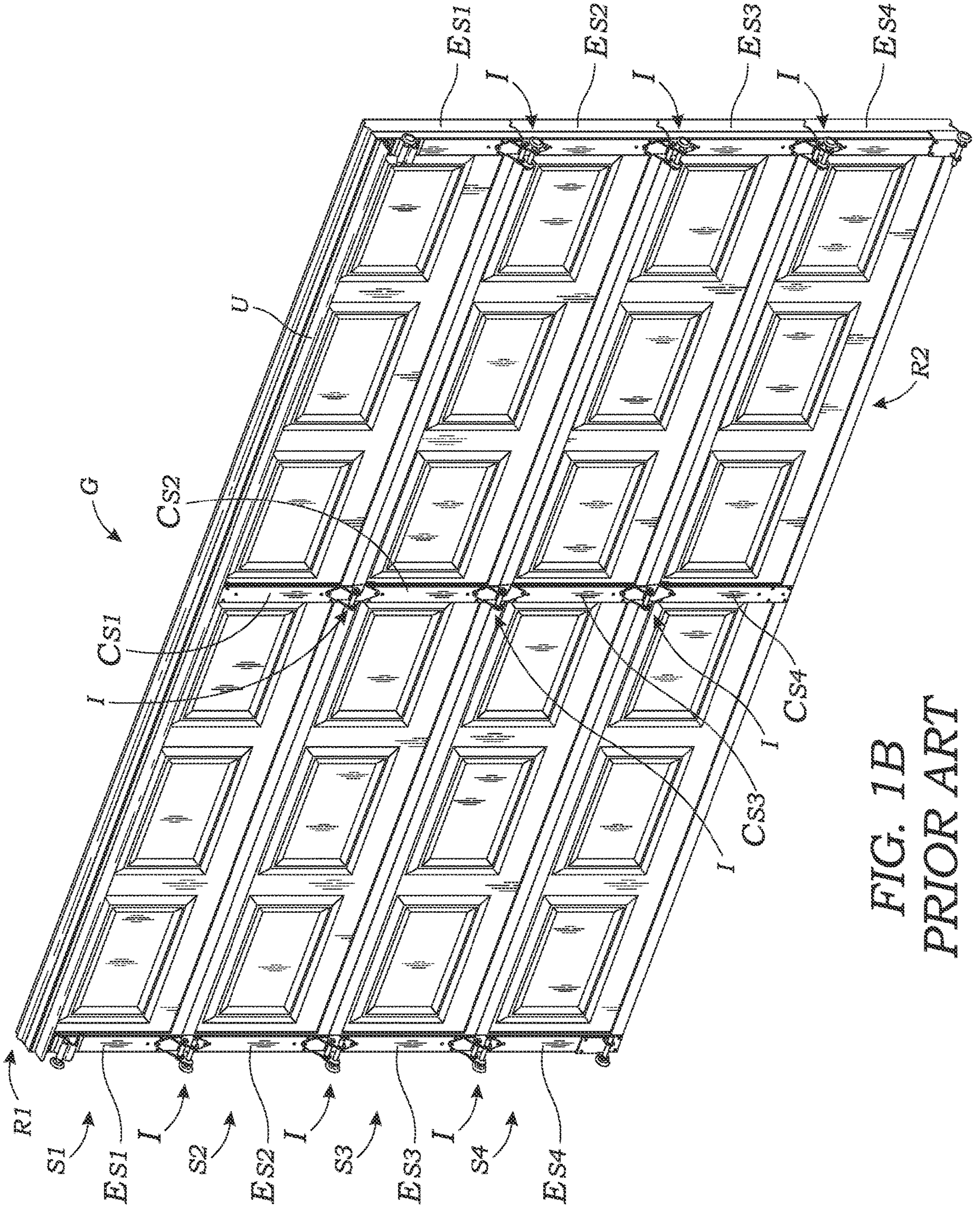
FIG. 1B PRIOR ART
FIG. 1B is a rear perspective view thereof.

Referring first to FIGS. 1A and 1B, there are shown front and rear perspective views of an exemplary prior art residential overhead garage door G, here as having four sections S1, S2, S3, S4 arranged vertically and hingeably edge-to-edge as is known in the art, with some details of the door sections and their rails R1, R2, stiles C, E, hinges I, and struts U and related hardware not shown for simplicity. As will be appreciated from particularly FIG. 1B and also FIG. 2A discussed further below, the typical overhead garage door G has each section S1, S2, S3, S4 formed or bent from a material such as sheet metal into a desired configuration in forming the respective face F and its opposite top and bottom rails R1, R2, with a vertical center stile C and opposite end stiles E then assembled onto the rear of each section S1, S2, S3, S4 along with any lengthwise or longitudinal strut U adjacent to typically the upper edge of the respective section S1, S2, S3, S4, with hinges I then assembled on the rear of the door G in joining the sections S1, S2, S3, S4 together, whether any such hardware is integral or separate and whether installed in any particular sequence, such as certain hardware like the plates of the hinges I and the brackets that secure the struts U sharing common fasteners when being installed on the respective center and end stiles C, E in generally completing the overhead garage door G construction. Once again, the typical width W of such a garage door G is eight feet (8 ft.) in the single-car garage context and sixteen feet (16 ft.) or even eighteen feet (18 ft.) in the two-car garage context, and the typical height H is approximately seven feet (7 ft.) made up of either three horizontal hinged door sections of approximately twenty-eight inches (28 in.) in height each or, as here and is most common, four horizontal hinged door sections S1, S2, S3, S4 of approximately twenty-one inches (21 in.) in height $H_{S1}$, $H_{S2}$, $H_{S3}$, $H_{S4}$ each. The nominal depth D of the garage door G may again be on the order of one to two inches (1-2 in.) based on a variety of factors, which is the effective depth or thickness of the door sections S1, S2, S3, S4 not including any additional hardware such as hinges I and struts U, versus the configuration of the overhead garage door section 9 disclosed in U.S. Pat. No. 4,779,325 to Mullet wherein the overhead garage door panel 9 has a front sheet metal skin 10 from which is first formed or bent at its marginal lengthwise edges top and bottom horizontal rearwardly disposed single-ply rails or flanges 19, 19' and then is further progressively roll-formed into hemmed or double-ply integral rearwardly disposed upwardly offset lengthwise struts or upper and lower channels 20 and 20' extending longitudinally of the panel 9, such struts 20, 20' thus being integral with the panel or section 9 and defining a full depth or thickness of the panel or section 9 from the skin or face 10 forwardly to such channels or struts 20, 20' rearwardly beyond the rails 19, 19'. In the industrial overhead or roll-up door context, the doors are typically taller, such as nominally ten feet by ten feet (10 ft.×10 ft.) or twelve feet by fourteen feet (12 ft.×14 ft.), and may even be more "heavy duty" or employ relatively heavier gauge steel, but it will be appreciated that the individual door sections may still be comparable to residential door sections in height, such as on the order of twenty to thirty inches (20-30 in.), and fundamentally the principles of the present invention would apply with equal benefit in the commercial metal overhead or roll-up door context.

Figure 2A:
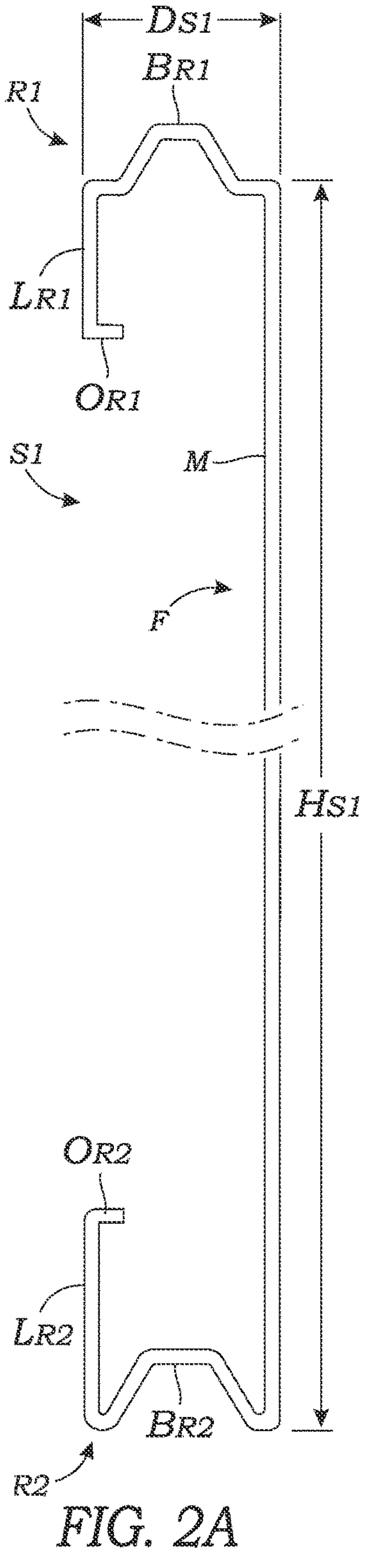
FIG. 2A PRIOR ART
FIG. 2A is an enlarged partial end view of a single section thereof.
Figure 2B:
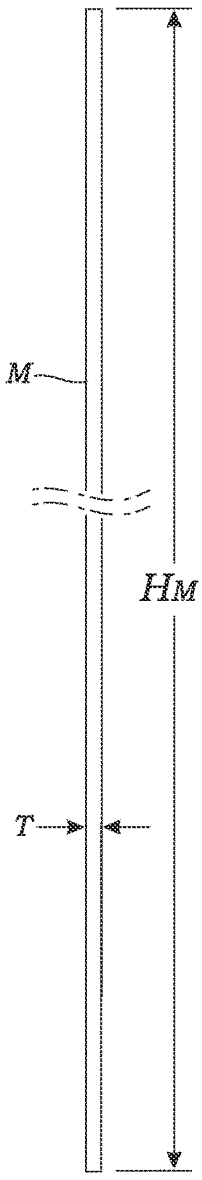
FIG. 2B PRIOR ART
FIG. 2B is an enlarged partial end view of the unformed flat sheet metal thereof.

As shown in FIG. 2A illustrating an end view or profile of a single exemplary prior art door section S1 of a representative residential overhead door as shown in FIG. 1, here with any stiles C, E or struts U (FIGS. 1A and 1B) or other door hardware removed for simplicity, the section S1 comprises a vertical substantially planar face F with an integral top rail R1 and opposite integral bottom rail R2 formed from a single piece of sheet metal M in a manner known in the art. Specifically, the top rail R1 is formed having a top rail body $B_{R1}$ that extends substantially rearwardly and perpendicularly from the face F and terminates in a downwardly extending top rail leg $L_{R1}$ that is substantially perpendicular to the top rail body $B_{R1}$ and thus substantially parallel to the face F, with the top rail leg $L_{R1}$ then terminating in a relatively shorter forwardly extending top rail foot $O_{R1}$ that is thus substantially perpendicular to both the top rail leg $L_{R1}$ and the face F and is thus substantially parallel to the top rail body $B_{R1}$. Similarly, the bottom rail R2 is formed having a bottom rail body $B_{R2}$ that extends substantially rearwardly and perpendicularly from the face F and terminates in an upwardly extending bottom rail leg $L_{R2}$ that is substantially perpendicular to the bottom rail body $B_{R2}$ and thus substantially parallel to the face F, with the bottom rail leg $L_{R2}$ then terminating in a relatively shorter forwardly extending bottom rail foot $O_{R2}$ that is thus substantially perpendicular to both the bottom rail leg $L_{R2}$ and the face F and is thus substantially parallel to the bottom rail body $B_{R2}$. As a threshold matter, it is noted that all directional indications are relative and simply for reference, with it being understood that forward or forwardly means the direction the front or outer surface of the garage door G faces, rear or rearwardly means the direction the back or inner surface of the garage door G faces, down or downwardly means toward the bottom of the garage door G, and up or upwardly means toward the top of the garage door G. As will also be seen in FIG. 2A and is known in the art, the top and bottom rail bodies $B_{R1}$, $B_{R2}$ may be formed with bends defining mating features when one garage door section is vertically arranged relative to another along adjacent edges, here shown as a tongue-and-groove or male-female arrangement, though it will be appreciated that other such configurations are possible and are or may be employed in the art. Once again, in the exemplary four-section overhead garage door G, each section such as the illustrated top section S1 has a height $H_{S1}$ that is nominally twenty-one inches (21 in.), which is specifically the height of the face F defined between the points where the top and bottom rail bodies $B_{R1}$, $B_{R2}$ are formed as by being bent rearwardly, and has a depth $D_{S1}$ that is essentially the front-to-back thickness of the section S1 from the forwardly-oriented face F to the rearwardly-facing rail legs $L_{R1}$, $L_{R2}$, again, thereby defining a full depth $D_{S1}$ of the section S1 not including any further rearwardly-oriented hardware such as struts U (FIG. 1B). Referring briefly to FIG. 2B, there is shown an end view of the flat or unformed piece of sheet metal M from which the section S1 of FIG. 2A is formed, which material M is nominally twenty-seven inches (27 in.) in height HM, it being appreciated that approximately three inches (3 in.) on each end is required to form the top and bottom rails R1, R2 in this example. Accordingly, the door section S1 would thus again have a nominal depth $D_{S1}$ of about one to two inches (1-2 in.) depending on the particular geometries of the top and bottom rails R1, R2. It will be appreciated by those skilled in the art once more that all such illustrative drawings are schematic in nature and not to be take literally or to scale as to any such dimensions, unless expressly stated herein. Relatedly, the sheet metal material thickness T may be in the range of 24-gauge or nominally 0.024 inch (0.024 in.) thick down to 32-gauge or nominally 0.01 inch (0.01 in.), though in most cases in the prior art residential door sections are formed of 26-gauge or nominally 0.018 inch (0.018 in.) thick sheet steel. Notably, in the typical prior art door section S1, the thickness of the section S1 is substantially constant over the entire profile as shown in FIG. 2A when formed of such unitary thickness sheet metal M, including the rails R1, R2, resulting in more metal or material where it is not necessarily needed in the face F in order to have the needed thickness and thus strength or rigidity in the rails R1, R2, thereby adding weight and cost to the door G that can be avoided when employing section configurations according to aspects of the present invention, and that without adding to but in fact reducing the overall depth of each section S1 and thus of the overall door G.

Figure 3A:
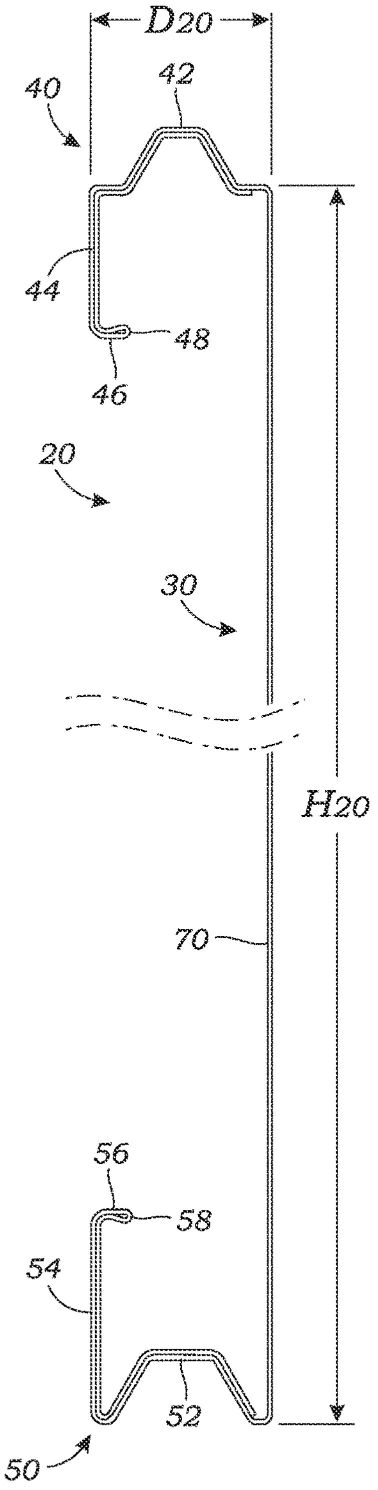
FIG. 3A is a partial end view of a first exemplary hemmed edge overhead garage door section, in accordance with at least one embodiment.
Figure 3B:
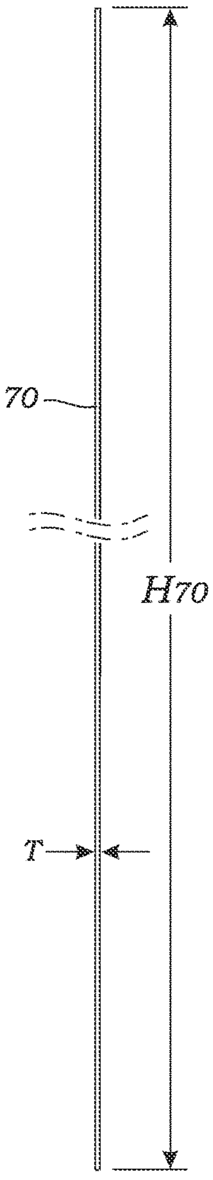
FIG. 3B is a partial end view of the unformed flat sheet metal thereof.

Turning to FIGS. 3A and 3B, there are shown end views analogous to those of FIGS. 2A and 2B here for a new and novel hemmed edge overhead garage door section 20 according to aspects of the present invention, which again generally comprises a face 30 and opposite top and bottom rails 40, 50. In such first exemplary embodiment of the door section 20 as shown, as in the exemplary prior art door section S1, again with any stiles or other door hardware removed for simplicity, the section 20 generally comprises a vertical substantially planar face 30 with an integral top rail 40 and opposite integral bottom rail 50 formed from a single piece of sheet metal 70 by a roll-forming or other such technique as is known and practiced in the art. Specifically, the top rail 40 is formed having a top rail body 42 that extends substantially rearwardly and perpendicularly from the face 30 and terminates in a downwardly extending top rail leg 44 that is substantially perpendicular to the top rail body 42 and thus substantially parallel to the face 30, with the top rail leg 44 then terminating in a relatively shorter forwardly extending top rail foot 46 that is thus substantially perpendicular to both the top rail leg 44 and the face 30 and is thus substantially parallel to the top rail body 42. Notably, and as distinct from the exemplary typical prior art section S1 of a single-ply or unitary-thickness sheet metal profile and particularly the rails R1, R2, in the inventive section 20 according to aspects of the present invention, here continuing with the top rail 40, rather than just terminating at the end of the top rail foot 46, the material 70 continues as by being bent or there being formed at the end of the top rail foot 46 a one-hundred-eighty-degree (180 deg.) top rail foot bend 48 such that the folded over or hemmed material 70 follows the profile of the top rail 40 back around eventually toward or near the section face 30 where the top rail body 42 was first bent rearwardly, there thus being formed a double-layer or two-ply top rail 40 while advantageously having a single-layer or single-ply face 30, more about which is said below in connection with FIGS. 4 and 5. Similarly, the bottom rail 50 is formed having a bottom rail body 52 that extends substantially rearwardly and perpendicularly from the face 30 and terminates in an upwardly extending bottom rail leg 54 that is substantially perpendicular to the bottom rail body 52 and thus substantially parallel to the face 30, with the bottom rail leg 54 then terminating in a relatively shorter forwardly extending bottom rail foot 56 that is thus substantially perpendicular to both the bottom rail leg 54 and the face 30 and is thus substantially parallel to the bottom rail body 52. Again, rather than just terminating at the end of the bottom rail foot 56, the material 70 continues as by being bent or there being formed at the end of the bottom rail foot 56 a one-hundred-eighty-degree (180 deg.) bottom rail foot bend 58 such that the folded over or hemmed material 70 follows the profile of the bottom rail 50 back around eventually toward or near the section face 30 where the bottom rail body 52 was first bent rearwardly, there thus again being formed a double-layer or two-ply bottom rail 50 while advantageously having a single-layer or single-ply face 30, here more about which is said below in connection with FIGS. 6 and 7. It will be appreciated by those skilled in the art that while for both the top and bottom rails 40, 50 as illustrated the material 70 is folded back on itself interiorly at the respective top rail and bottom rail foot bends 48, 58, meaning that at each such bend 48, 58 the material 70 is initially bent or formed toward the respective top and bottom rail bodies 42, 52 and legs 44, 54, it is also possible that the double-ply material be formed around the outer profile rather than the inner profile of the respective top and bottom rails 40, 50.

With continued reference to FIG. 3B, there is shown an end view of the flat or unformed piece of sheet metal 70 from which the exemplary door section 20 of FIG. 3A is formed, which material 70 is here nominally thirty-three inches (33 in.) in height $H_{70}$, it being appreciated that approximately six inches (6 in.) on each end is required to form the top and bottom rails 40, 50 in this example since they have the double-layer or double-ply thickness of material 70, again assuming a nominal twenty-one inch (21 in.) height $H_{20}$ of the door section 20 and face 30 specifically, rather than an overall height of twenty seven inches (27 in.) with three inches (3 in.) on each end for the opposite single-ply rails R1, R2 as in the prior art door section S1 of FIGS. 2A and 2B. Accordingly, the door section 20 would thus again have a nominal depth $D_{20}$ of about one to two inches (1-2 in.) depending on the particular geometries of the top and bottom rails 40, 50, such as including but not limited to a nominal one-and-three-eighths inch (1⅜ in.), which full depth depth $D_{20}$ is essentially the front-to-back thickness of the section 20 from the forwardly-oriented face 30 to the rearwardly-facing rail legs 44, 54, again, thereby defining a full depth $D_{20}$ of the section 20 not including any further rearwardly-oriented hardware such as struts U (FIG. 1B) that are bolted on or integral struts 20, 20' as distinct from the rails 19, 19' in U.S. Pat. No. 4,779,325 to Mullet. For example, if the steel sheet material 70 were 29-gauge or nominally 0.0135 inch (0.0135 in.) thick steel, noted as thickness T in FIG. 3B, rather than the typical 26-gauge or nominally 0.018 inch (0.018 in.) thick sheet steel in many current pan door sections S1 (FIGS. 2A and 2B), and even with the hemmed or double-layered rails 40, 50 leading to a nominally thirty-three inch (33 in.) wide steel strip 70, noted as height $H_{70}$ in FIG. 3B, in forming the top and bottom rails 40, 50, this would result in a rail thickness of approximately 0.027 inch (0.027 in.=0.0135 in.+0.0135 in.), about fifty percent (50%) thicker than the current standard 0.018 inch (0.018 in.) thick sheet steel throughout the whole section S1. Thus, while the steel sheet strip width is about twenty-two percent (22%) greater ((33-27)/27), the thickness of the steel sheet itself is about twenty-five percent (25%) less ((0.018-0.0135)/0.018) for a total steel reduction of about eight percent (8%) in pounds per door section 20, assuming a single-car overhead garage door having a nominal width of eight feet (8 ft.), with even further weight reduction being achieved for larger or wider overhead doors. It is believed that the resulting door section 20 and rails 40, 50 specifically, though lighter overall as basically having less steel per section 20, will be stronger than the current 0.018 inch (0.018 in.) thick section S1 as in FIG. 2A, but all that is required is for the section 20 to be the same or comparable strength, and that without necessarily any struts U (FIG. 1B), with the strength or stiffness requirement or beam strength for the overall garage door and each section thereof that is met or exceeded employing door sections 20 according to aspects of the present invention being any such standard or measurement adopted and in force for a particular region or overhead door application, including but not limited to the older National Garage Door Manufacturers' standard as now codified in Section 9.2.1 of the ANSI/DASMA 102-2018 "Specifications for Sectional Doors" standard of one inch (1 in.) of deflection per one-hundred twenty inches (120 in.) of length for doors in the overhead position and any comparable standard that has been or is ever adopted; ultimately, the idea is that with such a door section 20 according to aspects of the present invention in the horizontal position and whether just under its own weight or with weight applied centrally it will have adequate beam strength or bend resistance so as to deflect vertically no more than existing door sections S1 as being acceptable performance in the industry, again, here achieving such performance with a smaller or thinner and lighter door section 20 and thus saving on cost even while meeting or exceeding performance. And it is also noted from an aesthetic perspective that the typical stamped or embossed panel designs can be consistently formed in 29-gauge or nominally 0.0135 inch (0.0135 in.) steel sheet even employing currently available manufacturing techniques. Furthermore, the added rail strength allows relatively smaller profile rails 40, 50, such as forming the rails 40, 50 as having a nominal one-and-three-eighths (1⅜ in.) panel or depth $D_{20}$ instead of two inches (2 in.), which would result in a total steel reduction of about fifteen percent (15%). In addition, because the rails 40, 50 and thus the door sections 20 are one-and-three-eighths (1⅜ in.) instead of two inches (2 in.), approximately one-hundred-twenty (120) doors can be put in a full trailer versus approximately one-hundred (100) doors that are two inches (2 in.) thick, all else being equal regarding any struts or other door hardware. Fundamentally, using 29-gauge or nominally 0.0135 inch (0.0135 in.) thick steel for single-car garage doors, which currently represent about half or fifty percent (50%) of the residential overhead door market, represents a savings of roughly twenty-eight to twenty-nine percent (28-29%) of the steel on every single-car door made and thus an overall reduction in steel for manufacturers of such residential overhead doors of roughly twenty-one to twenty-two percent (21-22%), which reduction in weight or amount of steel thus translates to cost savings of on the order of seventeen to eighteen percent (17-18%) accounting for the amount of steel used and the line time to produce it. Those skilled in the art will again appreciate that all such sizes and thicknesses of the section 20 and its related integral hemmed top and bottom rails 40, 50 yielding any such savings or reductions in amount or weight of steel and thus cost are illustrative of aspects of the present invention and non-limiting, but such dimensions and the use of 29-gauge or nominally 0.0135 inch (0.0135 in.) thick steel do represent the preferred embodiment here for at least a non-insulated residential overhead garage door section 20. In the case of an insulated residential overhead garage door section 20, 30-gauge or nominally 0.012 inch (0.012 in.) thick steel or even thinner may be employed including stamping or embossing the panels, again, so long as there is polyurethane or other insulating material behind or on the back side of the section face 30. That is, on doors with insulation, particularly polyurethane insulation, a reduction from 29-gauge or 0.0135 inch (0.0135 in.) thick to 30-gauge or 0.012 inch (0.012 in.) thick would provide a further roughly eleven percent (11%) weight savings, so on the order of an eight to ten percent (8-10%) cost savings on doors with polyurethane insulation. Again, by way of further illustration and not limitation, the overall rail profile or depth $D_{20}$ and thus that of the door section 20 may even be as low as one inch (1 in.) in a section configuration according to aspects of the present invention while still having the required longitudinal stiffness or strength even without any struts U (FIG. 1B). It will be appreciated that if the doors have a nominal thickness of one inch (1 in.) even more doors can be put in a full trailer versus approximately one-hundred (100) doors that are two inches (2 in.) thick, providing even further efficiency and cost-savings in storage and shipment, still of course based on other factors related to struts and other door hardware. That is, the amount of space required for a dealer to store product can be reduced by even up to fifty percent (50%), and noting that pan doors are currently the cheapest door in the industry yet they require as much space to ship and store as do much more expensive doors, the space savings benefit of such door or door sections according to aspects of the present invention is significant. In any such configuration of an overhead garage door section 20 according to aspects of the present invention, it will be appreciated that any insulation backing or rear panel or sheet (not shown) would be formed and contained effectively within the profile of the door section 20 such as shown in FIG. 3A between the face 30 and rails 40, 50, analogous to the face 10 and rails 19, 19' of U.S. Pat. No. 4,779,325 to Mullet and its insulation 12 and backing layer 11 at that same depth or thickness, such that again the entire integral door section 20 with hemmed or two-ply rails 40, 50 of the present invention defines the depth $D_{20}$ of the section 20 from its face 30 to the rail legs 44, 54, including any insulation contained therebetween, such full depth $D_{20}$ of the section 20 thus not including any struts U (FIG. 1B) or other structure extending rearwardly of any such door section 20.

Figure 5:
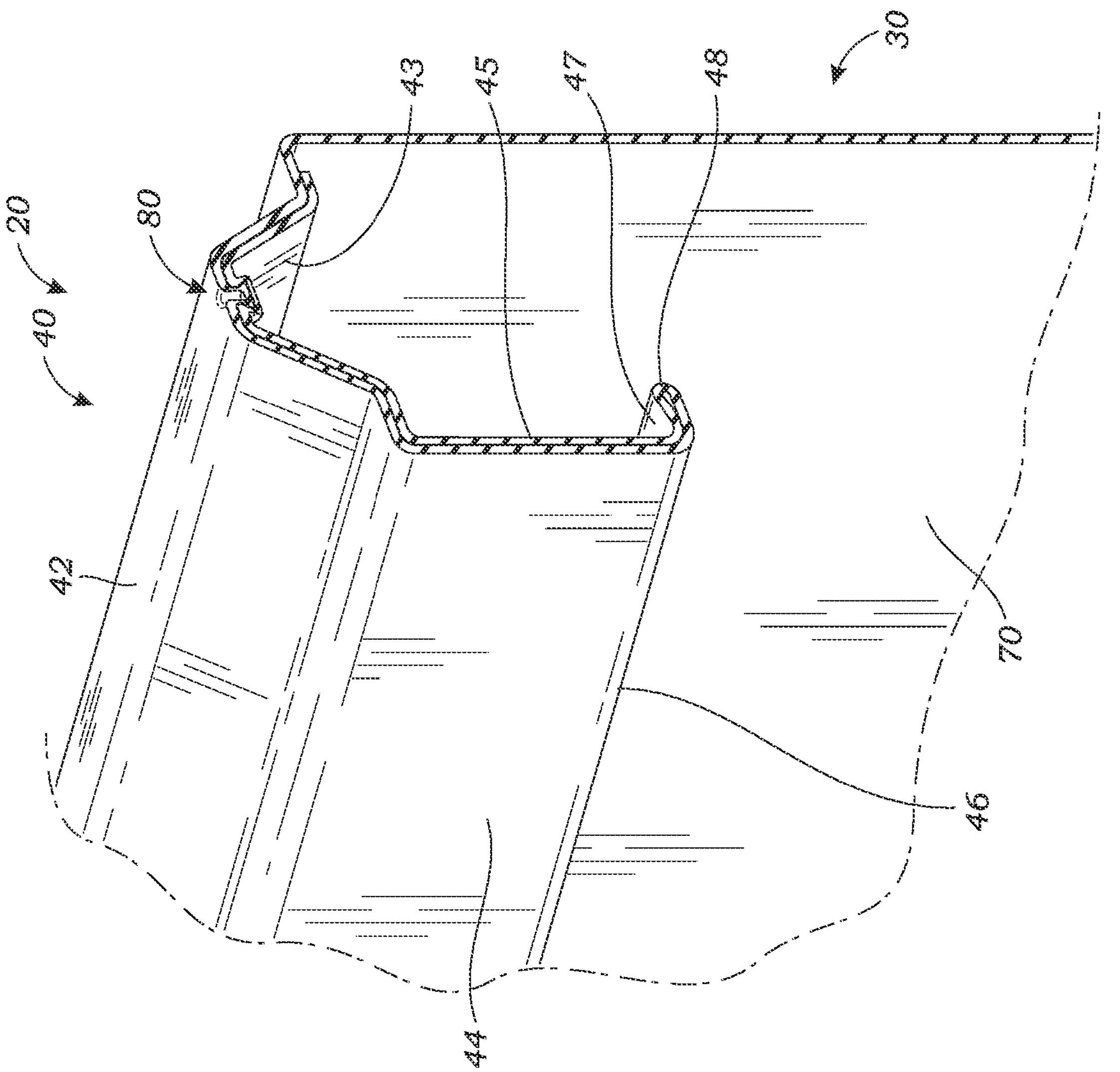
FIG. 5 is an enlarged partial perspective view of the top rail thereof.
Figure 4:
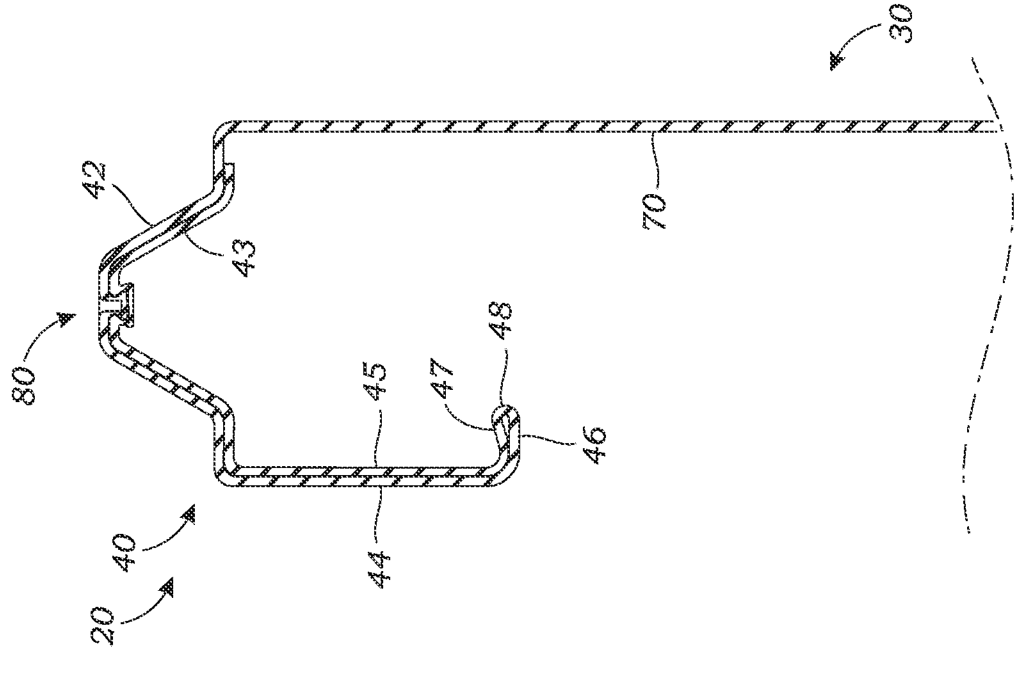
FIG. 4 is an enlarged partial end view of the top rail thereof.

Turning now to FIGS. 4 and 5, there are shown enlarged end and perspective sectional views of the top rail 40 of the first exemplary door section 20 according to aspects of the present invention of FIG. 3A. Once again, the top rail 40 is formed as by roll-forming or other such technique now known or later developed flat sheet material such as sheet steel 70 along a lengthwise edge so as to define a top rail body 42 that extends substantially rearwardly and perpendicularly from the substantially planar face 30 and terminates in a downwardly extending top rail leg 44 that is substantially perpendicular to the top rail body 42 and thus substantially parallel to the face 30, with the top rail leg 44 then terminating in a relatively shorter forwardly extending top rail foot 46 that is thus substantially perpendicular to both the top rail leg 44 and the face 30 and is thus substantially parallel to the top rail body 42. And rather than just terminating at the end of the top rail foot 46, the material 70 continues as by being bent or there being formed at the end of the top rail foot 46 a one-hundred-eighty-degree (180 deg.) top rail foot bend 48 such that a top rail foot layer 47 is then formed lying substantially along and adjacent to the top rail foot 46, the material 70 then further being bent at the top rail leg 44 such that a top rail leg layer 45 is then formed lying substantially along and adjacent to the top rail leg 44, and the material 70 then further being bent at the top rail body 42 such that a top rail body layer 43 is then formed lying substantially along and adjacent to the top rail body 42, whereby the folded over or hemmed material 70 follows the profile of the top rail 40 back around eventually toward or near the section face 30 where the top rail body 42 was first bent rearwardly, there thus being formed a double-layer or two-ply top rail 40 while advantageously having a single-layer or single-ply face 30. Once again, while a particular configuration or profile of the top rail 40 is shown, including having any feature or shape formed into or as part of the upwardly-facing top rail body 42, it will be appreciated that such configuration is merely illustrative and non-limiting. Further, where the top rail body layer 43 terminates along the top rail body 42 relative to the face 30 can also vary depending on a number of factors, and as noted previously, the top rail foot bend 48 may go the opposite direction away from the top rail body 42 and top rail leg 44 and so the top rail body, leg, and foot layers 43, 45, 47 may instead lie along the outside rather than the inside of the respective top rail body, leg, and foot 42, 44, 46.

Figure 7:
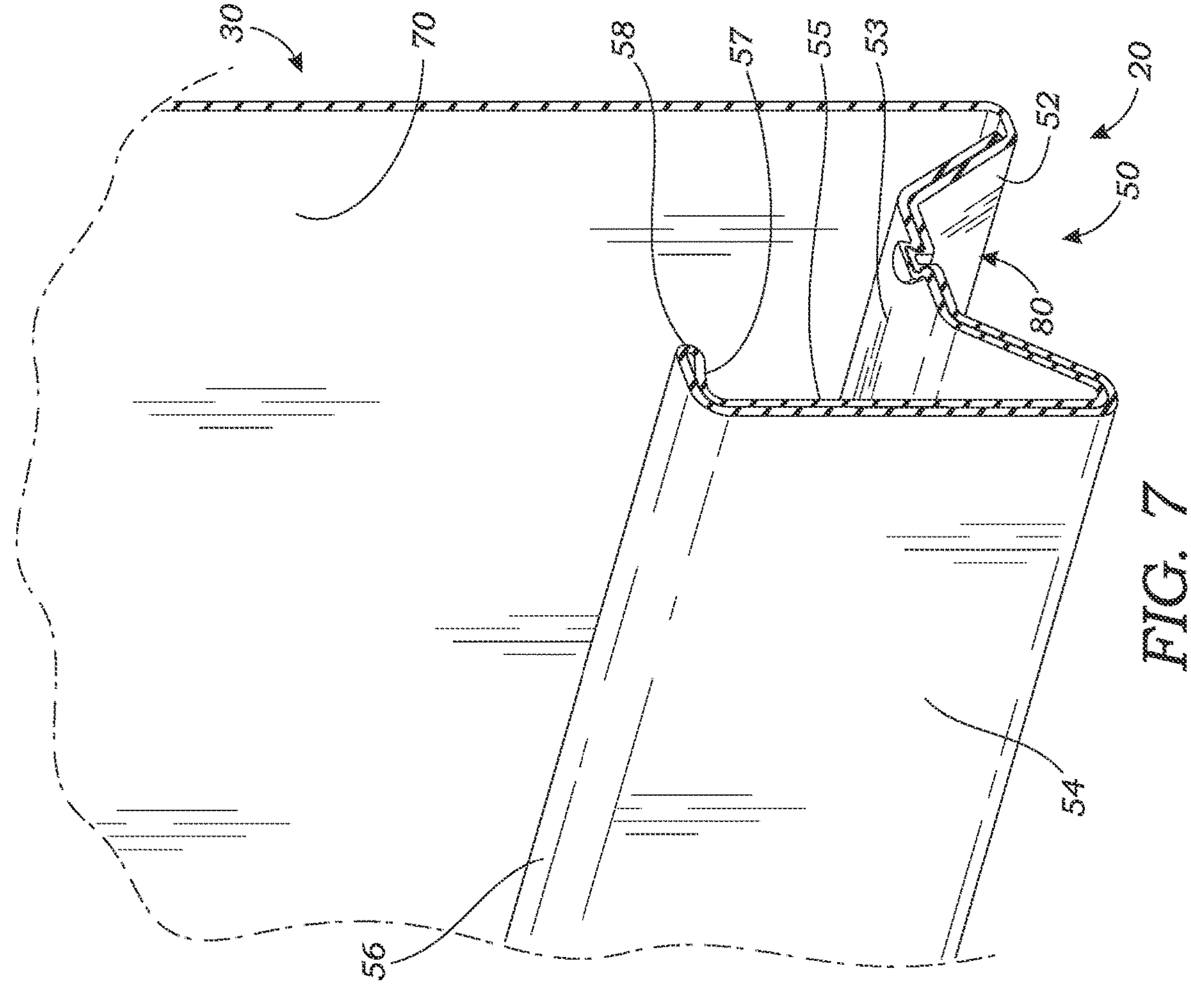
FIG. 7 is an enlarged partial perspective view of the bottom rail thereof.
Figure 6:
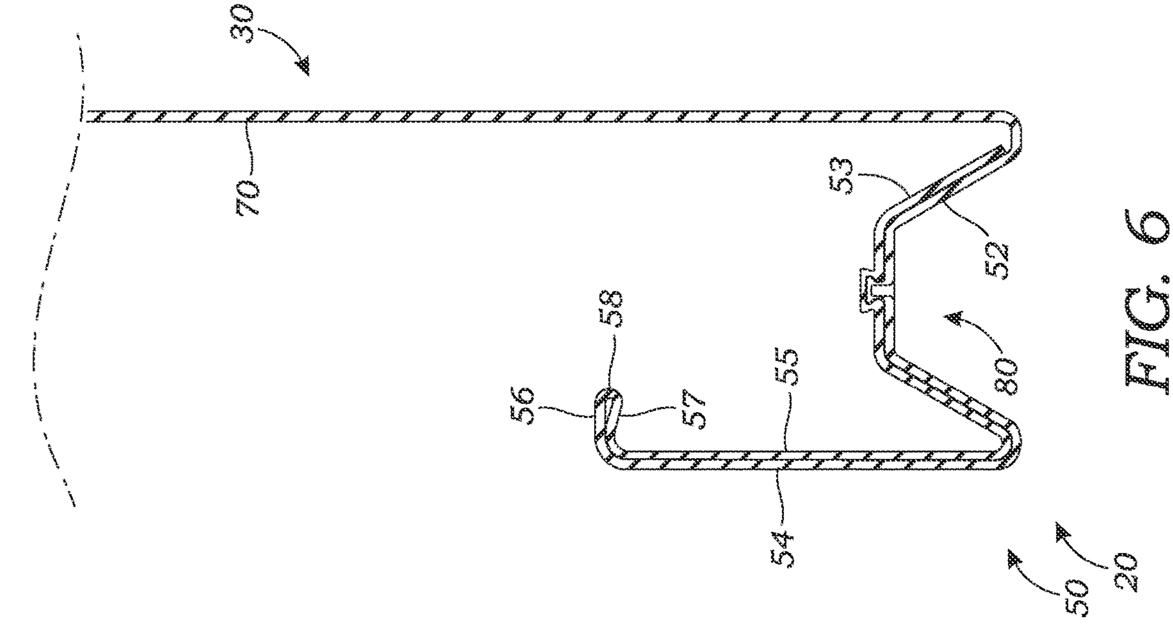
FIG. 6 is an enlarged partial end view of the bottom rail thereof.

Similarly, with reference to FIGS. 6 and 7, there are shown enlarged end and perspective sectional views of the bottom rail 50 of the first exemplary door section 20 according to aspects of the present invention of FIG. 3A. Once again, the bottom rail 50 is formed as by roll-forming or other such technique now known or later developed flat sheet material such as sheet steel 70 along a lengthwise edge so as to define a bottom rail body 52 that extends substantially rearwardly and perpendicularly from the substantially planar face 30 and terminates in an upwardly extending bottom rail leg 54 that is substantially perpendicular to the bottom rail body 52 and thus substantially parallel to the face 30, with the bottom rail leg 54 then terminating in a relatively shorter forwardly extending bottom rail foot 56 that is thus substantially perpendicular to both the bottom rail leg 54 and the face 30 and is thus substantially parallel to the bottom rail body 52. And rather than just terminating at the end of the bottom rail foot 56, the material 70 continues as by being bent or there being formed at the end of the bottom rail foot 56 a one-hundred-eighty-degree (180 deg.) bottom rail foot bend 58 such that a bottom rail foot layer 57 is then formed lying substantially along and adjacent to the bottom rail foot 56, the material 70 then further being bent at the bottom rail leg 54 such that a bottom rail leg layer 55 is then formed lying substantially along and adjacent to the bottom rail leg 54, and the material 70 then further being bent at the bottom rail body 52 such that a bottom rail body layer 53 is then formed lying substantially along and adjacent to the bottom rail body 52, whereby the folded over or hemmed material 70 follows the profile of the bottom rail 50 back around eventually toward or near the section face 30 where the bottom rail body 52 was first bent rearwardly, there thus being formed a double-layer or two-ply bottom rail 50 while again advantageously having a single-layer or single-ply face 30. Once again, while a particular configuration or profile of the bottom rail 50 is shown, including having any feature or shape formed into or as part of the downwardly-facing bottom rail body 52 configured so as to mate with the corresponding upwardly-facing top rail body 42 of an adjacent door section 20, it will be appreciated that any such configuration is merely illustrative and non-limiting. Further, where the bottom rail body layer 53 terminates along the bottom rail body 52 relative to the face 30 can also vary depending on a number of factors, and as noted previously, the bottom rail foot bend 58 may go the opposite direction away from the bottom rail body 52 and bottom rail leg 54 and so the bottom rail body, leg, and foot layers 53, 55, 57 may instead lie along the outside rather than the inside of the respective bottom rail body, leg, and foot 52, 54, 56.

With continued reference to FIGS. 4-7, it will be appreciated that some form of fasteners or fastening means 80 may be employed in securing adjacent layers of sheet metal 70 together in the hemmed top and bottom rails 40, 50 as herein described, including but not limited to sheet metal clinch joints or a clinching system as illustrated such as commercialized under the name Tog-L-Loc® by Blechverbindungstechnik GmbH in Germany (doing business as BTM or BTM Europe), rivets, screws, welding or spot welding, bonding as with adhesives, and any other such fasteners or fastening means now known or later developed as appropriate for joining adjacent layers of sheet metal. Those skilled in the art will appreciate that any such fastening of adjacent layers of sheet metal, such as layers 42, 43, layers 44, 45, and/or layers 46, 47 in the top rail 40 and layers 52, 53, layers 54, 55, and/or layers 56, 57 in the bottom rail 50, may further improve or increase the stiffness or strength of the hemmed rails 40, 50 and thus the overall door section 20 as by better ensuring that any hemmed layers remain substantially adjacent or abutting both in production and in use over time. Any such fasteners or fastening means 80 may be employed individually or along with or in combination with one or more others, and in the case of any discrete fasteners or fastening means 80, versus anything that might be somewhat continuous along the entire length of the hemmed rails 40, 50, such fasteners 80 may be spaced along the rails 40, 50 as appropriate, including potentially having multiple fasteners 80 at the same longitudinal location along a rail 40, 50, such as for example fasteners 80 both in the top and bottom rail bodies 42, 52 and the respective top and bottom rail body layers 43, 53 and in the top and bottom rail legs 44, 54 and the respective top and bottom rail leg layers 45, 55. In the case of screws as the fasteners 80, at least at the locations of any stiles and/or hinges on the door sections 20, it will be appreciated that the same screws affixing any such stiles and/or hinges to the rails 40, 50 may also secure the adjacent rail leg layers 44, 45 and layers 54, 55, for example. And as for the illustrated Tog-L-Loc® clinch joint fasteners 80, those skilled in the art will appreciate that while such are shown as joining the top rail body 42 and adjacent layer 43 and the bottom rail body 52 and adjacent layer 53, and specifically the central horizontal portions of each shaped rail body 42, 52, such is not required even if as a practical matter those layers or portions as oriented horizontally may be the simplest to access by the related punch and die tooling to form such clinch joint fasteners 80 in the manner currently known in the art.

Figure 8A:
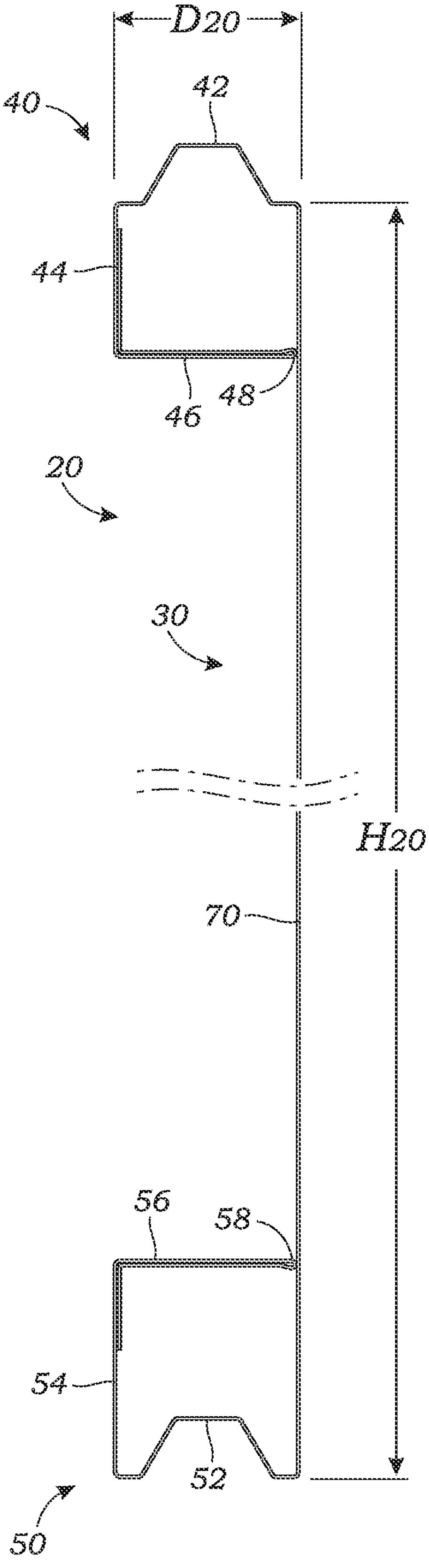
FIG. 8A is a partial end view of a second exemplary hemmed edge overhead garage door section, in accordance with at least one embodiment.
Figure 8B:
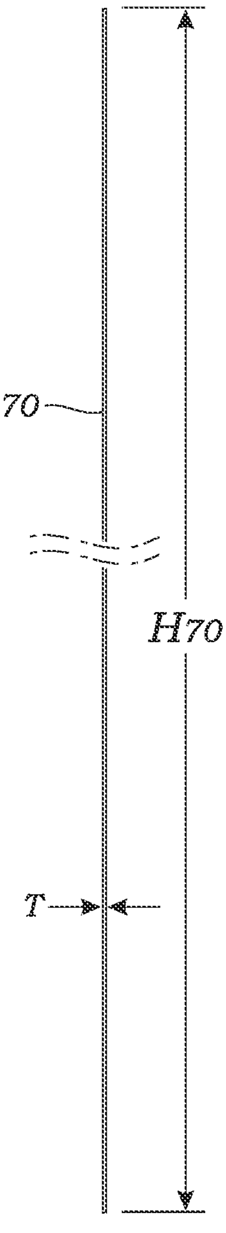
FIG. 8B is a partial end view of the unformed flat sheet metal thereof.

Turning to FIGS. 8A and 8B, there are shown end views analogous to those of FIGS. 3A and 3B here for an alternative exemplary new and novel hemmed edge overhead garage door section 20 according to aspects of the present invention, which again generally comprises a face 30 and opposite top and bottom rails 40, 50. In such second exemplary embodiment of the door section 20 as shown, as in the exemplary prior art door section S1 and first exemplary embodiment door section of FIGS. 3-7, again with any stiles or other door hardware removed for simplicity, the section 20 generally comprises a vertical substantially planar face 30 with an integral top rail 40 and opposite integral bottom rail 50 formed from a single piece of sheet metal 70 by a roll-forming or other such technique as is known and practiced in the art. Specifically, the top rail 40 is again formed having a top rail body 42 that extends substantially rearwardly and perpendicularly from the face 30 and terminates in a downwardly extending top rail leg 44 that is substantially perpendicular to the top rail body 42 and thus substantially parallel to the face 30, with the top rail leg 44 then terminating in a forwardly extending top rail foot 46 that is thus substantially perpendicular to both the top rail leg 44 and the face 30 and is thus substantially parallel to the top rail body 42 and here extends forwardly all the way into contact with the face 30 as distinct from the first exemplary embodiment of FIGS. 4 and 5. Once more, as distinct from the exemplary typical prior art section S1 of a single-ply or unitary-thickness sheet metal profile and particularly the rails R1, R2 as shown in FIGS. 2A and 2B, in the inventive section 20 according to aspects of the present invention, here continuing with the top rail 40, rather than just terminating at the end of the top rail foot 46, the material 70 continues as by being bent or there being formed at the end of the top rail foot 46 a one-hundred-eighty-degree (180 deg.) top rail foot bend 48 such that the folded over or hemmed material 70 follows the profile of the top rail 40 at least partially back around, there thus being formed a double-layer or two-ply top rail 40 while advantageously having a single-layer or single-ply face 30, more about which is said below in connection with FIGS. 9 and 10. Similarly, the bottom rail 50 is formed having a bottom rail body 52 that extends substantially rearwardly and perpendicularly from the face 30 and terminates in an upwardly extending bottom rail leg 54 that is substantially perpendicular to the bottom rail body 52 and thus substantially parallel to the face 30, with the bottom rail leg 54 then terminating in a forwardly extending bottom rail foot 56 that is thus substantially perpendicular to both the bottom rail leg 54 and the face 30 and is thus substantially parallel to the bottom rail body 52 and here extends forwardly all the way into contact with the face 30 as distinct from the first exemplary embodiment of FIGS. 6 and 7. Again, rather than just terminating at the end of the bottom rail foot 56, the material 70 continues as by being bent or there being formed at the end of the bottom rail foot 56 a one-hundred-eighty-degree (180 deg.) bottom rail foot bend 58 such that the folded over or hemmed material 70 follows the profile of the bottom rail 50 at least partially back around, there thus again being formed a double-layer or two-ply bottom rail 50 at least in part while advantageously having a single-layer or single-ply face 30, here more about which is said below in connection with FIGS. 11 and 12. It will be appreciated by those skilled in the art that while for both the top and bottom rails 40, 50 as illustrated the material 70 is folded back on itself interiorly at the respective top rail and bottom rail foot bends 48, 58, meaning that at each such bend 48, 58 the material 70 is initially bent or formed toward the respective top and bottom rail bodies 42, 52 and legs 44, 54, it is also possible that the double-ply material be formed around the outer profile rather than the inner profile of the respective top and bottom rails 40, 50. Notably, with the top rail foot 46 extending forwardly back to the face 30 such that the top rail foot bend 48 is in contact with the rearwardly-facing surface of the face 30 and similarly with the bottom rail foot 56 extending forwardly back to the face 30 such that the bottom rail foot bend 58 is in contact with the rearwardly-facing surface of the face 30, it will be appreciated that a "boxed hem" or boxed or enclosed top and bottom rail 40, 50 is formed. Moreover, at the point of contact between the top and bottom rail foot bends 48, 58 and the section face 30, such may be affixed as by welding, bonding, or any such fastener or fastening means now known or later developed to further stabilize and strengthen such boxed top and bottom rails 40, 50 in the alternative configuration shown in FIG. 8A.

Turning briefly to FIG. 8B, there is shown an end view of the flat or unformed piece of sheet metal 70 from which the alternative exemplary door section 20 of FIG. 8A is formed, which material 70 may here be nominally thirty-one inches (31 in.) in width or height $H_{70}$, it being appreciated that approximately five inches (5 in.) on each end is required to form the top and bottom rails 40, 50 in this example since they have the double-layer or double-ply thickness of material 70 not completely around the rail profile, more about which is said below in connection with FIGS. 9-12, again assuming a nominal twenty-one inch (21 in.) height $H_{20}$ of the door section 20 and face 30 specifically, again as compared to an overall height of twenty seven inches (27 in.) with three inches (3 in.) on each end for the opposite single-ply rails R1, R2 as in the prior art door section S1 of FIGS. 2A and 2B. Accordingly, the door section 20 would thus again have a nominal depth $D_{20}$ of about one to two inches (1-2 in.) depending on the particular geometries of the top and bottom rails 40, 50, such as including but not limited to a nominal one-and-three-eighths inch (1⅜ in.) depth $D_{20}$. Here, by way of further illustration and not limitation, the nominal thickness of the sheet metal 70 may be as thin as 30-gauge or 0.012 inch (0.012 in.) thick or even less with the "boxed hem" rails 40, 50 providing even further stiffness or strength, though it will be appreciated once more that an unrelated factor in material thickness for the door sections 20 is the desired stamping or embossing of the panels or face 30 of each section 20 irrespective of the configuration and strength or integrity of the top and bottom rails 40, 50 in any particular configuration according to aspects of the present invention.

Figure 10:
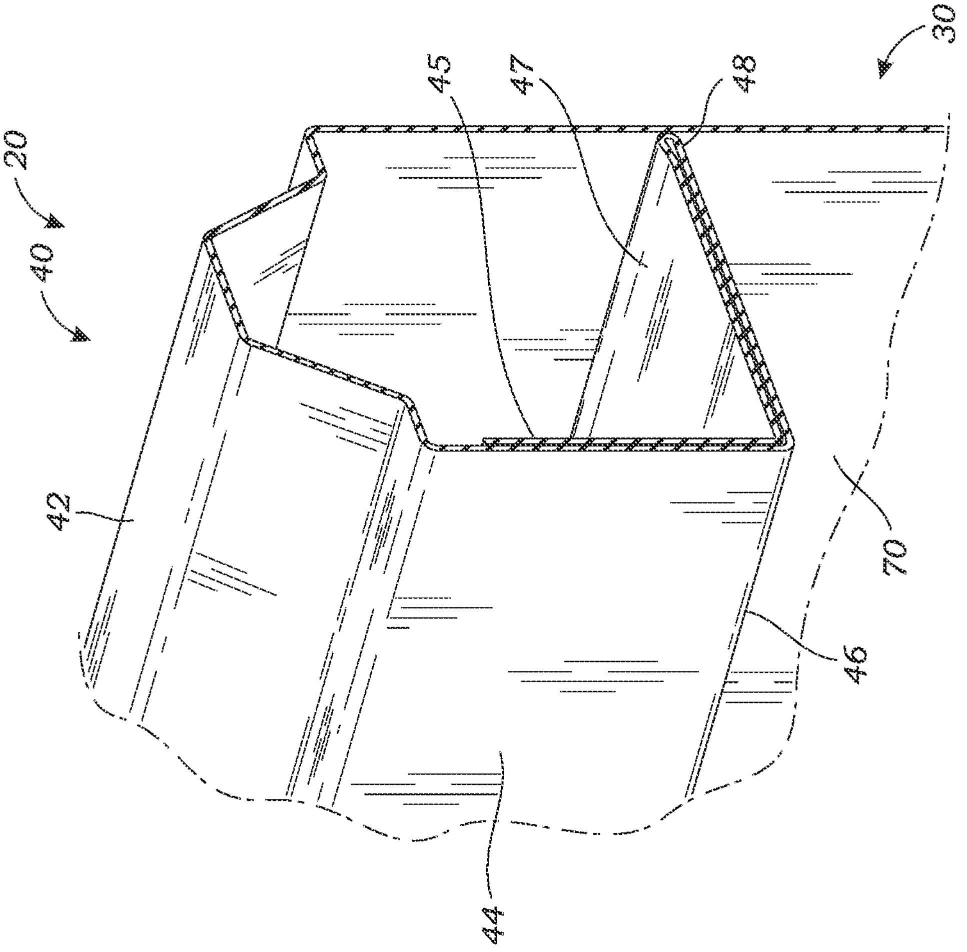
FIG. 10 is an enlarged partial perspective view of the top rail thereof.
Figure 9:
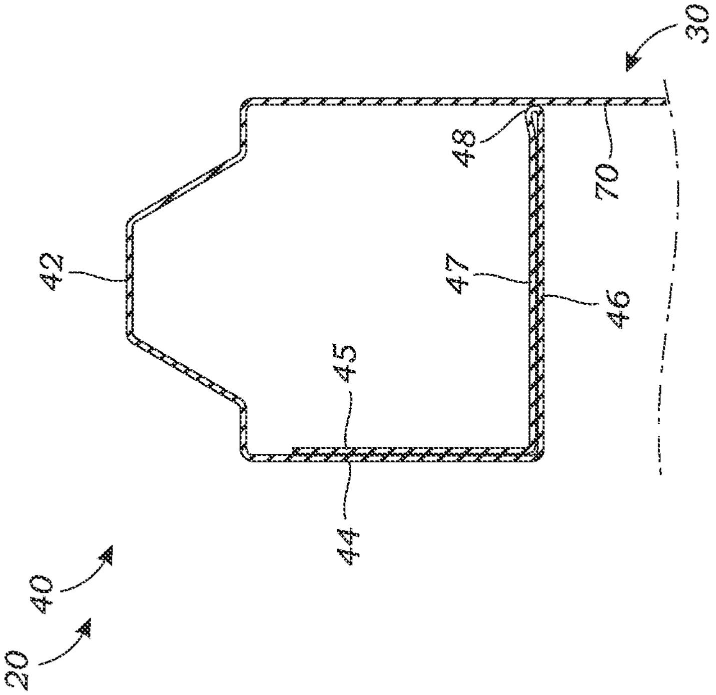
FIG. 9 is an enlarged partial end view of the top rail thereof.

With reference to FIGS. 9 and 10, there are shown enlarged end and perspective sectional views of the top rail 40 of the second exemplary door section 20 according to aspects of the present invention of FIG. 8A. Once again, the top rail 40 is formed as by roll-forming or other such technique now known or later developed flat sheet material such as sheet steel 70 along a lengthwise edge so as to define a top rail body 42 that extends substantially rearwardly and perpendicularly from the substantially planar face 30 and terminates in a downwardly extending top rail leg 44 that is substantially perpendicular to the top rail body 42 and thus substantially parallel to the face 30, with the top rail leg 44 then terminating in a forwardly extending top rail foot 46 that is thus substantially perpendicular to both the top rail leg 44 and the face 30 and is thus substantially parallel to the top rail body 42 and again extends forwardly all the way into contact with the face 30. And rather than just terminating at the end of the top rail foot 46, the material 70 continues as by being bent or there being formed at the end of the top rail foot 46 a one-hundred-eighty-degree (180 deg.) top rail foot bend 48 such that a top rail foot layer 47 is then formed lying substantially along and adjacent to the top rail foot 46, the material 70 then further being bent at the top rail leg 44 such that a top rail leg layer 45 is then formed lying at least partially substantially along and adjacent to the top rail leg 44, whereby the folded over or hemmed material 70 follows at least a portion of the profile of the top rail 40, there thus being formed at least partially a double-layer or two-ply top rail 40 while advantageously having a single-layer or single-ply face 30. Once again, while a particular configuration or profile of the top rail 40 is shown, including having any feature or shape formed into or as part of the upwardly-facing top rail body 42, it will be appreciated that such configuration is merely illustrative and non-limiting. Further, where the top rail leg layer 45 terminates along the top rail leg 44 in this example can also vary depending on a number of factors, and certainly in other exemplary embodiments the material 70 may continue on around the profile of the top rail 40 so as to also lie as a second layer or ply along at least a portion of the top rail body 42 as in the first exemplary embodiment of FIGS. 4 and 5. And as noted previously, the top rail foot bend 48 may go the opposite direction away from the top rail body 42 and top rail leg 44 and so the top rail leg and foot layers 45, 47 in this example may instead lie along the outside rather than the inside of the respective top rail leg and foot 44, 46.

Figure 12:
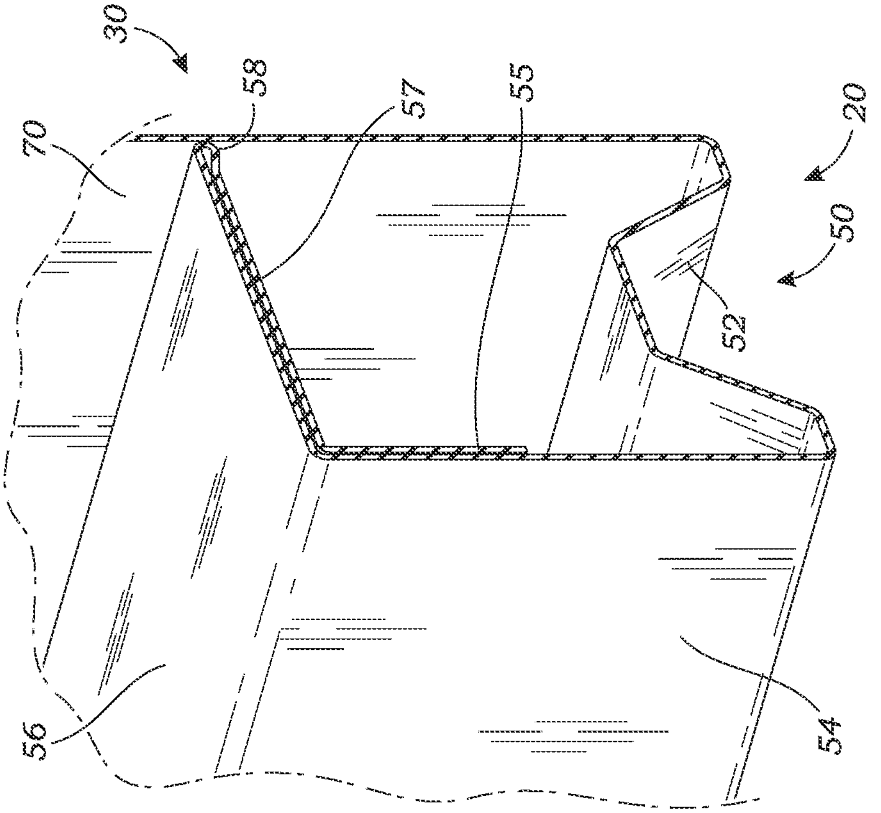
FIG. 12 is an enlarged partial perspective view of the bottom rail thereof.
Figure 11:
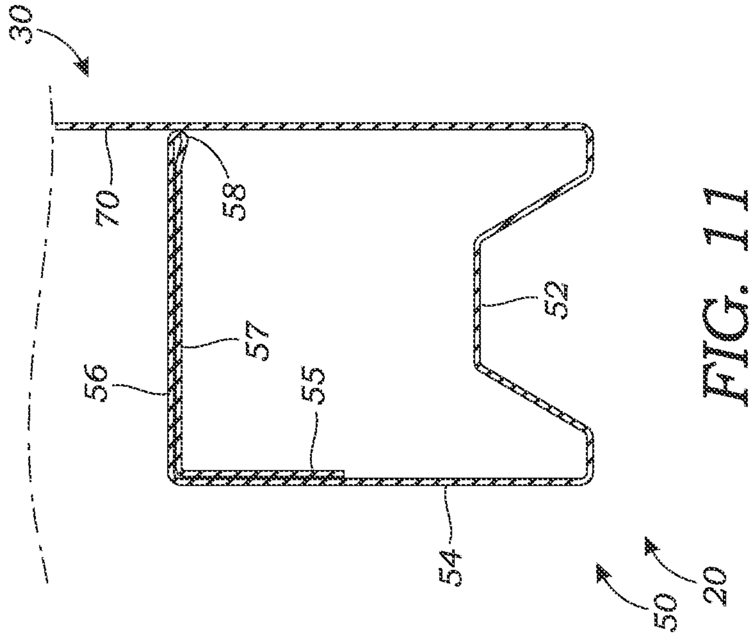
FIG. 11 is an enlarged partial end view of the bottom rail thereof.

Similarly, with reference to FIGS. 11 and 12, there are shown enlarged end and perspective sectional views of the bottom rail 50 of the second exemplary door section 20 according to aspects of the present invention of FIG. 8A. Once again, the bottom rail 50 is formed as by roll-forming or other such technique now known or later developed flat sheet material such as sheet steel 70 along a lengthwise edge so as to define a bottom rail body 52 that extends substantially rearwardly and perpendicularly from the substantially planar face 30 and terminates in an upwardly extending bottom rail leg 54 that is substantially perpendicular to the bottom rail body 52 and thus substantially parallel to the face 30, with the bottom rail leg 54 then terminating in a forwardly extending bottom rail foot 56 that is thus substantially perpendicular to both the bottom rail leg 54 and the face 30 and is thus substantially parallel to the bottom rail body 52 and here again extends forwardly all the way into contact with the face 30. And rather than just terminating at the end of the bottom rail foot 56, the material 70 continues as by being bent or there being formed at the end of the bottom rail foot 56 a one-hundred-eighty-degree (180 deg.) bottom rail foot bend 58 such that a bottom rail foot layer 57 is then formed lying substantially along and adjacent to the bottom rail foot 56, the material 70 then further being bent at the bottom rail leg 54 such that a bottom rail leg layer 55 is then formed lying at least partially substantially along and adjacent to the bottom rail leg 54, whereby the folded over or hemmed material 70 at least partially follows the profile of the bottom rail 50, there thus being formed at least a partial double-layer or two-ply bottom rail 50 while again advantageously having a single-layer or single-ply face 30. Once again, while a particular configuration or profile of the bottom rail 50 is shown, including having any feature or shape formed into or as part of the downwardly-facing bottom rail body 52 configured so as to mate with the corresponding upwardly-facing top rail body 42 of an adjacent door section 20, it will be appreciated that any such configuration is merely illustrative and non-limiting. Further, once more, where the bottom rail leg layer 55 terminates along the bottom rail leg 54 can also vary depending on a number of factors, and certainly in other exemplary embodiments the material 70 may continue on around the profile of the bottom rail 50 so as to also lie as a second layer or ply along at least a portion of the bottom rail body 52 as in the first exemplary embodiment of FIGS. 6 and 7. And as noted previously, the bottom rail foot bend 58 may go the opposite direction away from the bottom rail body 52 and bottom rail leg 54 and so the bottom rail leg and foot layers 55, 57 may instead lie along the outside rather than the inside of the respective bottom rail leg and foot 54, 56.

Figure 13:
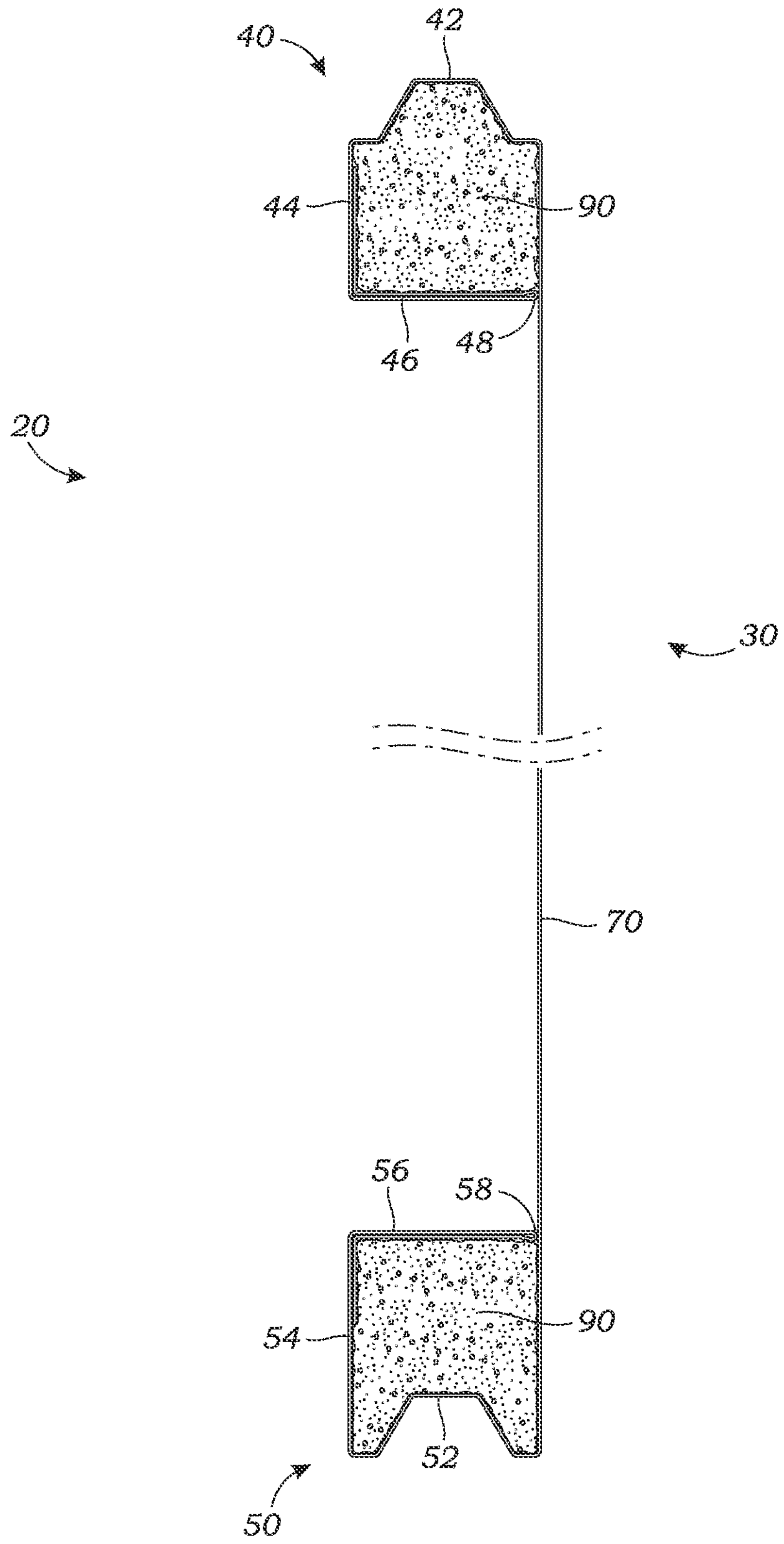
FIG. 13 is a partial end view of a third exemplary hemmed edge overhead garage door section, in accordance with at least one embodiment.

Turning briefly to FIG. 13, there is shown an end view analogous to FIG. 8A here for a further alternative exemplary new and novel hemmed edge overhead garage door section 20 according to aspects of the present invention, which again generally comprises a face 30 and opposite top and bottom rails 40, 50. In such third exemplary embodiment of the door section 20 as shown, like that of FIGS. 8-12, with the top rail foot 46 extending forwardly back to the face 30 such that the top rail foot bend 48 is in contact with the rearwardly-facing surface of the face 30 and similarly with the bottom rail foot 56 extending forwardly back to the face 30 such that the bottom rail foot bend 58 is in contact with the rearwardly-facing surface of the face 30, a “boxed hem” or boxed or enclosed top and bottom rail 40, 50 is formed, and that whether or not the point of contact between the top and bottom rail foot bends 48, 58 and the section face 30 is affixed as by welding, bonding, or any such fastener or fastening means now known or later developed to further stabilize and strengthen such “boxed” top and bottom rails 40, 50. It will be appreciated, then, as shown in FIG. 13, that such enclosed space along and within each longitudinal rail 40, 50 may be filled with a foamed-in-place polyurethane or other such insulation 90 whether now known or later developed to add further stiffness and strength to the rails 40, 50 and thus potentially allow the thickness of the sheet metal material 70 to go even thinner, within other constraints on the instruction such as again embossing or stamping the panels or faces 30 of the door sections 20. Those skilled in the art will once again appreciate that various combinations of such rail 40, 50 configurations and material 70 thicknesses as well as optional fasteners or fastening means 80 along the rails 40, 50 and rail insulation 90 may be employed in various overhead door contexts, whether residential or commercial, according to aspects of the present invention without departing from its spirit and scope.

Alternatively to any of the hemmed edge rails 40, 50 of FIGS. 3-13, it is also possible that the sheet metal material 70 may be rolled or formed to a non-uniform thickness as by being relatively thicker at the marginal lengthwise edges and relatively thinner in the middle, such that edge rails 40, 50 may then be roll-formed from such non-uniform sheet as being thicker than the remaining middle portion of the material 70 that defines the section face 30, but it will be appreciated by those skilled in the art that not only would such approach be relatively more challenging in manufacturing, as a practical matter such would then require a different setup for each width or height $H_{70}$ of material 70 that is to be run, which is to say that if a manufacturer or a steel mill had a supply problem with one width of material for a particular finished door section height, they could slit the material 70 to the needed strip width in producing sections 20 according to aspects of the present invention, whereas if a steel mill roll formed the material 70 thinner in the middle and thicker on the outer, such material cannot then be cut down and used for shorter or smaller door sections. Again, according to aspects of the present invention, an advantage of the hemmed rail approach is thus that all flat sheet materials 70 are simply the thickness T (e.g., 0.0135 in.) times the strip width $H_{70}$ (e.g., 31 in. or 33 in.). Even so, in certain contexts the benefit of the hemmed rail 40, 50 according to aspects of the present invention can be achieved via a non-uniform thickness sheet metal 70 starting point and such is expressly then encompassed within the spirit and scope of the present invention, meaning that a “hemmed” edge or rail is to be understood as an increased-thickness rail 40, 50 formed integrally with the section face 30. Another significant advantage of such a thicker or reinforced rail 40, 50 design as set forth herein is that such will work with every manufacturer in the industry, as such approach maintains a manufacturer’s particular edge or rail profile, and except for the weight difference, such a new lighter door section 20 according to aspects of the present invention would be essentially indistinguishable from such manufacturers’ current products in terms of form and fit in building their complete overhead door. Other considerations in all of this, as will be appreciated by those skilled in the art, are the actual metal selected from which the sections 20 are to be formed and any related metallurgy or chemistry in terms of the hardness and elasticity of any such sheet metal 70, any and all of which, whether now known or later developed, is encompassed by the present invention, it being noted that such material engineering and selection is effectively a balancing act between the material being soft enough to stamp and having enough beam strength to function properly in the particular commercial application or context, or here the particular overhead door and door section 20 configuration. And as a practical matter, some decisions related to material thickness are dictated by a decreasing rate of return as the amount of steel or other metal or material is removed from the section 20, the main reason for this decreasing rate of return being that steel mills must run a production line, whether making 0.018 inch (0.018 in.) or 0.012 inch (0.012 in.) thick steel sheet, such that for relatively thinner steel, the charge for the line run time is a higher percentage of the total cost. Fundamentally, in prior art door sections, struts are added material to increase the beam strength of the door, whether such struts are bolt-on or integrally formed with the rails and/or stiles, with there being no potential for cost savings, just a performance improvement, and with any such struts adding overall depth or thickness to the finished door section, particularly disadvantageous with integral struts when it comes to storage and shipping. Whereas with hemmed or increased-thickness rails 40, 50 in the door sections 20 according to aspects of the present invention, such adds strength where needed most in the rails 40, 50 while reducing steel or material in the face 30 and while maintaining or even decreasing the overall depth or thickness of the door section 20, the entire hemmed rail 40, 50 being contained within the depth profile of the section 20, thus creating the first way to simultaneously reduce cost and even overall door thickness while increasing strength, which has heretofore not been achieved in the prior art that again generally does not have a cost savings component.

In forming any such hemmed edge overhead garage door section according to aspects of the present invention, it will be appreciated that any appropriate materials and methods of construction now known or later developed may be employed, including but not limited to sheet steel of various gauge thicknesses, any such components being fabricated or formed as through rolling, stamping, forming, or any other such technique now known or later developed. Relatedly, any hemmed portions of the edges or rails of any such door sections may be secured in any appropriate secondary operation employing any assembly technique now known or later developed, including but not limited to clinching, fastening, bonding, welding, press-fitting, snapping, or any other such technique now known or later developed. Those skilled in the art will fundamentally appreciate that any such materials and methods of construction are encompassed within the scope of the invention, any exemplary materials and methods in connection with any and all embodiments thus being illustrative and non-limiting.

Aspects of the present specification may also be described as the following numbered embodiments:

1. A hemmed edge overhead garage door section, comprising a face, a top rail integral with the face formed longitudinally therealong, the top rail comprising at least a top rail body extending rearwardly from the face and a top rail leg extending downwardly from the top rail body offset from the face, the top rail body and at least a portion of the top rail leg being thicker than the face, and a bottom rail integral with the face formed longitudinally therealong opposite of the top rail, the bottom rail comprising at least a bottom rail body extending rearwardly from the face and a bottom rail leg extending upwardly from the bottom rail body offset from the face, the bottom rail body and at least a portion of the bottom rail leg being thicker than the face, wherein the face and the top and bottom rails thereof are formed integrally of a single material and define a full depth of the hemmed edge overhead garage door section without any rearwardly extending strut, and wherein the resulting hemmed edge overhead garage door section has a relatively thinner face and relatively thicker top and bottom rails for increased strength with reduced weight and cost.

2. The hemmed edge overhead garage door section of embodiment 1, wherein the top rail further comprises a top rail foot extending forwardly from the top rail leg toward the face, and the bottom rail further comprises a bottom rail foot extending forwardly from the bottom rail leg toward the face.

3. The hemmed edge overhead garage door section of embodiment 2, wherein the top rail foot terminates forwardly in a top rail foot bend of the single material, the top rail further comprising a top rail foot layer lying along and adjacent to the top rail foot and still further comprising a top rail leg layer lying at least partially along and adjacent to the top rail leg, the bottom rail foot terminates forwardly in a bottom rail foot bend, the bottom rail further comprising a bottom rail foot layer lying along and adjacent to the bottom rail foot and still further comprising a bottom rail leg layer lying at least partially along and adjacent to the bottom rail leg, and the top and bottom rails are formed continuously with the face from the single material, whereby the top rail foot and the top rail foot layer, at least a portion of the top rail leg and the top rail leg layer, the bottom rail foot and the bottom rail foot layer, and at least a portion of the bottom rail leg and the bottom rail leg layer each together define a thickness that is double that of the face.

4. The hemmed edge overhead garage door section of embodiment 3, wherein a fastener secures at least one of the top rail foot and the top rail foot layer, the top rail leg and the top rail leg layer, the bottom rail foot and the bottom rail foot layer, and the bottom rail leg and the bottom rail leg layer.

5. The hemmed edge overhead garage door section of embodiment 4, wherein the fastener is selected from the group consisting of clinch joints, rivets, screws, welding, and bonding.

6. The hemmed edge overhead garage door section of any of embodiments 3-5, wherein the top rail leg layer lies fully along and adjacent to the top rail leg, the top rail further comprising a top rail body layer lying at least partially along and adjacent to the top rail body, and the bottom rail leg layer lies fully along and adjacent to the bottom rail leg, the bottom rail further comprising a bottom rail body layer lying at least partially along and adjacent to the bottom rail body.

7. The hemmed edge overhead garage door section of embodiment 6, wherein a fastener secures at least one of the top rail foot and the top rail foot layer, the top rail leg and the top rail leg layer, the top rail body and the top rail body layer, the bottom rail foot and the bottom rail foot layer, the bottom rail leg and the bottom rail leg layer, and the bottom rail body and the bottom rail body layer.

8. The hemmed edge overhead garage door section of embodiment 7, wherein the fastener is selected from the group consisting of clinch joints, rivets, screws, welding, and bonding.

9. The hemmed edge overhead garage door section of any of embodiments 3-8, wherein the top rail foot extends forwardly such that the top rail foot bend is in contact with the face, and the bottom rail foot extends forwardly such that the bottom rail foot bend is in contact with the face, whereby the top and bottom rails are boxed.

10. The hemmed edge overhead garage door section of embodiment 9, wherein the top and bottom rail foot bends are affixed to the face.

11. The hemmed edge overhead garage door section of embodiment 10, wherein the top and bottom rail foot bends are affixed to the face via at least one of welding, bonding, and fastening.

12. The hemmed edge overhead garage door section of any of embodiments 2-11, wherein the top and bottom rails are filled with an insulation.

13. The hemmed edge overhead garage door section of any of embodiments 2-12, wherein the top rail foot extends forwardly into contact with the face, and the bottom rail foot extends forwardly into contact with the face, whereby the top and bottom rails are boxed.

14. The hemmed edge overhead garage door section of embodiment 13, wherein the top rail foot and the bottom rail foot are each affixed to the face.

15. The hemmed edge overhead garage door section of embodiment 14, wherein the top rail foot and the bottom rail foot are each affixed to the face via at least one of welding, bonding, and fastening.

16. The hemmed edge overhead garage door section of any of embodiments 13-15, wherein the top and bottom rails are filled with an insulation.

17. The hemmed edge overhead garage door section of embodiments 1-16, wherein the single material comprises sheet metal.

18. The hemmed edge overhead garage door section of embodiment 17, wherein the sheet metal comprises sheet steel no thicker than 0.0135 inch.

19. The hemmed edge overhead garage door section of any of embodiments 1-18, wherein the full depth is no greater than one-and-three-eighths inch.

20. A method of manufacturing a hemmed edge overhead garage door section as defined in any of embodiments 1-19, the method comprising the steps of forming the single material from a piece of sheet metal at a desired width, and roll-forming the integral top and bottom rails along the marginal lengthwise edges of the sheet metal set apart from the face by forming the top rail having at least a top rail body extending rearwardly from the face and a top rail leg extending downwardly from the top rail body offset from the face and forming the bottom rail having at least a bottom rail body extending rearwardly from the face and a bottom rail leg extending upwardly from the bottom rail body offset from the face.

21. The method of embodiment 20, wherein the step of forming the single material from a piece of sheet metal further comprises forming the sheet metal of non-uniform thickness as by being relatively thicker at the marginal lengthwise edges and relatively thinner in the middle, such that the top and bottom rails are then roll-formed from such non-uniform sheet as being thicker than the remaining middle portion of the sheet metal that defines the face.

22. The method of embodiment 20 or embodiment 21, wherein the step of roll-forming the integral top and bottom rails further comprises forming a top rail foot extending forwardly from the top rail leg toward the face and forming a bottom rail foot extending forwardly from the bottom rail leg toward the face.

23. The method of embodiment 22, wherein the step of roll-forming the integral top and bottom rails further comprises forming the top rail foot with a top rail foot bend of the sheet metal, a top rail foot layer lying along and adjacent to the top rail foot, and a top rail leg layer lying at least partially along and adjacent to the top rail leg and forming the bottom rail foot with a bottom rail foot bend of the sheet metal, a bottom rail foot layer lying along and adjacent to the bottom rail foot, and a bottom rail leg layer lying at least partially along and adjacent to the bottom rail leg.

24. The method of embodiment 23, comprising the further step of fastening at least one of the top rail foot and the top rail foot layer, the top rail leg and the top rail leg layer, the bottom rail foot and the bottom rail foot layer, and the bottom rail leg and the bottom rail leg layer.

25. The method of embodiment 23 or embodiment 24, wherein the step of roll-forming the integral top and bottom rails further comprises forming a top rail body layer lying at least partially along and adjacent to the top rail body and forming a bottom rail body layer lying at least partially along and adjacent to the bottom rail body.

26. The method of embodiment 25, comprising the further step of fastening at least one of the top rail body and the top rail body layer and the bottom rail body and the bottom rail body.

27. The method of any of embodiments 23-26, comprising the further step of affixing the top and bottom rail foot bends to the face.

28. The method of any of embodiments 22-27, comprising the further step of filling the top and bottom rails with an insulation.

29. A method of using a hemmed edge overhead garage door section as defined in any of embodiments 1-19, the method comprising the step of hingeably installing multiple hemmed edge overhead garage door sections together along longitudinal edges such that a bottom rail of a first hemmed edge overhead garage door section is adjacent to a top rail of a second hemmed edge overhead garage door section to construct an operable overhead garage door without any rearwardly extending strut.

30. A kit comprising multiple hemmed edge overhead garage door sections as defined in any of embodiments 1-19.

31. The kit of embodiment 30, further comprising instructional material.

32. The kit of embodiment 31, wherein the instructional material provides instructions on how to perform the method as defined in embodiment 29.

33. Use of a hemmed edge overhead garage door section as defined in any one of embodiments 1-19 to construct an overhead garage door having reduced weight, size, and/or cost.

34. The use of embodiment 33, wherein the use comprises a method as defined in embodiment 29.

In closing, regarding the exemplary embodiments of the present invention as shown and described herein, it will be appreciated that a hemmed edge overhead garage door section and method of its manufacture and use is disclosed and configured for constructing an overhead garage door having reduced weight, size, and/or cost. Because the principles of the invention may be practiced in a number of configurations beyond those shown and described, it is to be understood that the invention is not in any way limited by the exemplary embodiments, but is generally able to take numerous forms without departing from the spirit and scope of the invention. It will also be appreciated by those skilled in the art that the present invention is not limited to the particular geometries and materials of construction disclosed, but may instead entail other functionally comparable structures or materials, now known or later developed, without departing from the spirit and scope of the invention.

Certain embodiments of the present invention are described herein, including the best mode known to the inventor(s) for carrying out the invention. Of course, variations on these described embodiments will become apparent to those of ordinary skill in the art upon reading the foregoing description. The inventor(s) expect skilled artisans to employ such variations as appropriate, and the inventor(s) intend for the present invention to be practiced otherwise than specifically described herein. Accordingly, this invention includes all modifications and equivalents of the subject matter recited in the claims appended hereto as permitted by applicable law. Moreover, any combination of the above-described embodiments in all possible variations thereof is encompassed by the invention unless otherwise indicated herein or otherwise clearly contradicted by context.

Groupings of alternative embodiments, elements, or steps of the present invention are not to be construed as limitations. Each group member may be referred to and claimed individually or in any combination with other group members disclosed herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

In some embodiments, the numbers expressing quantities of components or ingredients, properties such as dimensions, weight, concentration, reaction conditions, and so forth, used to describe and claim certain embodiments of the inventive subject matter are to be understood as being modified in some instances by terms such as "about," "approximately," or "roughly." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the inventive subject matter are approximations, the numerical values set forth in any specific examples are reported as precisely as practicable. The numerical values presented in some embodiments of the inventive subject matter may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. The recitation of numerical ranges of values herein is merely intended to serve as a shorthand method of referring individually to each separate value falling within the range. Unless otherwise indicated herein, each individual value of a numerical range is incorporated into the specification as if it were individually recited herein. Similarly, all lists of values should be considered as inclusive of intermediate values unless the context indicates the contrary.

Use of the terms "may" or "can" in reference to an embodiment or aspect of an embodiment also carries with it the alternative meaning of "may not" or "cannot." As such, if the present specification discloses that an embodiment or an aspect of an embodiment may be or can be included as part of the inventive subject matter, then the negative limitation or exclusionary proviso is also explicitly meant, meaning that an embodiment or an aspect of an embodiment may not be or cannot be included as part of the inventive subject matter. In a similar manner, use of the term "optionally" in reference to an embodiment or aspect of an embodiment means that such embodiment or aspect of the embodiment may be included as part of the inventive subject matter or may not be included as part of the inventive subject matter. Whether such a negative limitation or exclusionary proviso applies will be based on whether the negative limitation or exclusionary proviso is recited in the claimed subject matter.

The terms "a," "an," "the" and similar references used in the context of describing the present invention (especially in the context of the following claims) are to be construed to cover both the singular and the plural, unless otherwise indicated herein or clearly contradicted by context. Further, ordinal indicators—such as "first," "second," "third," etc.—for identified elements are used to distinguish between the elements, and do not indicate or imply a required or limited number of such elements, and do not indicate a particular position or order of such elements unless otherwise specifically stated.

All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the inventive subject matter and does not pose a limitation on the scope of the inventive subject matter otherwise claimed. No language in the application should be construed as indicating any non-claimed element essential to the practice of the invention.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

While aspects of the invention have been described with reference to at least one exemplary embodiment, it is to be clearly understood by those skilled in the art that the invention is not limited thereto. Rather, the scope of the invention is to be interpreted only in conjunction with the appended claims and it is made clear, here, that the inventor(s) believe that the claimed subject matter is the invention.

What is claimed is:

1. A hemmed edge overhead garage door section, comprising:

a face;

a top rail integral with the face formed longitudinally therealong and contiguous therewith, the top rail comprising at least a top rail body extending rearwardly from the face, a top rail leg extending downwardly from the top rail body offset from the face, and a top rail foot extending forwardly from the top rail leg toward the face; and a bottom rail integral with the face formed longitudinally therealong and contiguous therewith opposite of the top rail, the bottom rail comprising at least a bottom rail body extending rearwardly from the face, a bottom rail leg extending upwardly from the bottom rail body offset from the face, and a bottom rail foot extending forwardly from the bottom rail leg toward the face, wherein the face and the top and bottom rails thereof are formed integrally of a single material and define a full depth of the hemmed edge overhead garage door section, wherein the top rail foot terminates forwardly in a top rail foot bend of the single material, the top rail further comprising a top rail foot layer lying along and adjacent to the top rail foot, a top rail leg layer lying along and adjacent to the top rail leg, and a top rail body layer lying at least partially along and adjacent to the top rail body, wherein the bottom rail foot terminates forwardly in a bottom rail foot bend of the single material, the bottom rail further comprising a bottom rail foot layer lying along and adjacent to the bottom rail foot, a bottom rail leg layer lying along and adjacent to the bottom rail leg, and a bottom rail body layer lying at least partially along and adjacent to the bottom rail body, wherein the top and bottom rails are formed continuously with the face from the single material such that in the formed top rail the top rail body layer comprises a top edge of the single material lying along and adjacent to the top rail body and oriented extending forwardly toward the face and wherein in the formed bottom rail the bottom rail body layer comprises a bottom edge of the single material lying along and adjacent to the bottom rail body and oriented extending forwardly toward the face, and wherein in the resulting hemmed edge overhead garage door section the face is thinner than at least a portion of the top and bottom rails.

2. The hemmed edge overhead garage door section of claim 1, wherein a fastener directly secures at least one of the top rail foot with the top rail foot layer, the top rail leg with the top rail leg layer, the top rail body with the top rail body layer, the bottom rail foot with the bottom rail foot layer, the bottom rail leg with the bottom rail leg layer, and the bottom rail body with the bottom rail body layer.

3. The hemmed edge overhead garage door section of claim 2, wherein the fastener is selected from the group consisting of clinch joints, rivets, screws, welding, and bonding.

4. The hemmed edge overhead garage door section of claim 1, wherein:

the top rail foot extends forwardly such that the top rail foot bend is in contact with the face; and the bottom rail foot extends forwardly such that the bottom rail foot bend is in contact with the face, whereby the top and bottom rails are boxed.

5. The hemmed edge overhead garage door section of claim 4, wherein the top and bottom rail foot bends are affixed to the face.

6. The hemmed edge overhead garage door section of claim 5, wherein the top and bottom rail foot bends are affixed to the face via at least one of welding, bonding, and fastening.

7. The hemmed edge overhead garage door section of claim 4, wherein the top and bottom rails are filled with an insulation.

8. The hemmed edge overhead garage door section of claim 1, wherein the single material comprises sheet metal.

9. The hemmed edge overhead garage door section of claim 8, wherein the sheet metal comprises sheet steel no thicker than 0.0135 inch.

10. The hemmed edge overhead garage door section of claim 1, wherein the full depth is no greater than one-and-three-eighths inch.

11. A hemmed edge overhead garage door section, comprising:

a face;

a top rail integral with the face formed longitudinally therealong, the top rail comprising at least a top rail body extending rearwardly from the face, a top rail leg extending downwardly from the top rail body offset from the face, and a top rail foot extending forwardly from the top rail leg toward the face, the top rail foot terminating forwardly in a top rail foot bend, the top rail further comprising a top rail foot layer lying along and adjacent to the top rail foot and still further comprising a top rail leg layer lying at least partially along and adjacent to the top rail leg; and a bottom rail integral with the face formed longitudinally therealong opposite of the top rail, the bottom rail comprising at least a bottom rail body extending rearwardly from the face, a bottom rail leg extending upwardly from the bottom rail body offset from the face, and a bottom rail foot extending forwardly from the bottom rail leg toward the face, the bottom rail foot terminating forwardly in a bottom rail foot bend, the bottom rail further comprising a bottom rail foot layer lying along and adjacent to the bottom rail foot and still further comprising a bottom rail leg layer lying at least partially along and adjacent to the bottom rail leg, wherein the face and the top and bottom rails thereof are formed integrally of a single material, whereby the top rail foot and the top rail foot layer, at least a portion of the top rail leg and the top rail leg layer, the bottom rail foot and the bottom rail foot layer, and at least a portion of the bottom rail leg and the bottom rail leg layer each together define a thickness that is double that of the face, wherein the top rail foot and the bottom rail foot each extends forwardly such that each of the top and bottom rail foot bends is in contact with the face, whereby the top and bottom rails are boxed, wherein the top and bottom rails are formed continuously with the face from the single material such that in the formed top rail the top rail leg layer comprises a top edge of the single material lying along and adjacent to the top rail leg and wherein in the formed bottom rail the bottom rail leg layer comprises a bottom edge of the single material lying along and adjacent to the bottom rail leg, and wherein in the resulting hemmed edge overhead garage door section the face is thinner than at least a portion of the top and bottom boxed rails.

12. The hemmed edge overhead garage door section of claim 11, wherein a fastener directly secures at least one of the top rail foot with the top rail foot layer, the top rail leg with the top rail leg layer, the bottom rail foot with the bottom rail foot layer, and the bottom rail leg with the bottom rail leg layer.

13. The hemmed edge overhead garage door section of claim 12, wherein the fastener is selected from the group consisting of clinch joints, rivets, screws, welding, and bonding.

14. The hemmed edge overhead garage door section of claim 11, wherein the top and bottom rail foot bends are affixed to the face.

15. The hemmed edge overhead garage door section of claim 14, wherein the top and bottom rail foot bends are affixed to the face via at least one of welding, bonding, and fastening.

16. The hemmed edge overhead garage door section of claim 11, wherein the top and bottom rails are filled with an insulation.

17. A hemmed edge overhead garage door section, comprising:

a face;

a top rail integral with the face formed longitudinally therealong, the top rail comprising a top rail body extending rearwardly from the face, a top rail leg extending downwardly from the top rail body offset from the face, a top rail foot extending forwardly from the top rail leg toward the face, a top rail foot layer lying along and adjacent to the top rail foot, a top rail leg layer lying along and adjacent to the top rail leg, and a top rail body layer lying at least partially along and adjacent to the top rail body; and a bottom rail integral with the face formed longitudinally therealong opposite of the top rail, the bottom rail comprising a bottom rail body extending rearwardly from the face, a bottom rail leg extending upwardly from the bottom rail body offset from the face, a bottom rail foot extending forwardly from the bottom rail leg toward the face, a bottom rail foot layer lying along and adjacent to the bottom rail foot, a bottom rail leg layer lying along and adjacent to the bottom rail leg, and a bottom rail body layer lying at least partially along and adjacent to the bottom rail body, wherein the top and bottom rails are formed continuously with the face from a single material such that in the formed top rail the top rail body layer comprises a top edge of the single material lying along and adjacent to the top rail body and oriented extending forwardly toward the face and wherein in the formed bottom rail the bottom rail body layer comprises a bottom edge of the single material lying along and adjacent to the bottom rail body and oriented extending forwardly toward the face, whereby the top rail foot and the top rail foot layer, the top rail leg and the top rail leg layer, the top rail body and the top rail body layer, the bottom rail foot and the bottom rail foot layer, the bottom rail leg and the bottom rail leg layer, and the bottom rail body and the bottom rail body layer each together define a two-ply thickness of the single material that is double the single-ply thickness of the single material of the face, and wherein fasteners directly secure the top rail body with the top rail body layer therealong and the bottom rail body with the bottom rail body layer therealong.

18. The hemmed edge overhead garage door section of claim 17, wherein the fasteners are selected from the group consisting of clinch joints, rivets, screws, welding, and bonding.

19. The hemmed edge overhead garage door section of claim 17, wherein:

a top rail foot bend between the top rail foot and the top rail foot layer is in contact with the face; and a bottom rail foot bend between the bottom rail foot and the bottom rail foot layer is in contact with the face, whereby the top and bottom rails are boxed.

20. The hemmed edge overhead garage door section of claim 19, wherein the top and bottom rails are filled with an insulation.

* * * * *